United States Patent
Nammoto et al.

(10) Patent No.: US 9,452,537 B2
(45) Date of Patent: Sep. 27, 2016

(54) ROBOT HAND, ROBOT, MANUFACTURING METHOD FOR ROBOT HAND

(71) Applicant: Seiko Epson Corporation, Tokyo (JP)

(72) Inventors: Takashi Nammoto, Azumino (JP); Kazuhiro Kosuge, Sendai (JP); Kosuke Hara, Sendai (JP); Kengo Yamaguchi, Sendai (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/612,789

(22) Filed: Feb. 3, 2015

(65) Prior Publication Data
US 2015/0217458 A1    Aug. 6, 2015

(30) Foreign Application Priority Data

Feb. 4, 2014   (JP) ................... 2014-019586
Feb. 4, 2014   (JP) ................... 2014-019587

(51) Int. Cl.
| | | |
|---|---|---|
| *B66C 1/42* | (2006.01) | |
| *B25J 15/06* | (2006.01) | |
| *B25J 13/08* | (2006.01) | |
| *B25J 15/10* | (2006.01) | |

(52) U.S. Cl.
CPC ............ B25J 15/065 (2013.01); B25J 13/087 (2013.01); B25J 15/0616 (2013.01); B25J 15/10 (2013.01); *Y10S 901/40* (2013.01); *Y10S 901/46* (2013.01)

(58) Field of Classification Search
CPC .. B25J 15/065; B25J 13/087; B25J 15/0616; B25J 15/10; B25J 19/007; B25J 15/0009; B25J 15/08; B25J 19/02; B25J 13/08; B25J 13/081; B25J 13/082; B25J 13/084; Y10S 901/40; Y10S 901/46

USPC .............. 294/86.4, 213, 907, 119.3; 901/40; 414/627, 737
See application file for complete search history.

(56) References Cited

U.S. PATENT DOCUMENTS

| | | | |
|---|---|---|---|
| T100,001 I4 * | 11/1980 | Frazer .................. | B66C 1/0281 294/183 |
| 5,373,747 A | 12/1994 | Ogawa et al. | |
| 6,979,032 B2 * | 12/2005 | Damhuis .............. | B25J 15/0052 294/185 |
| 7,000,964 B1 * | 2/2006 | Porras .................. | B65G 47/917 294/186 |
| 2004/0186626 A1 * | 9/2004 | Tsukamoto .......... | B25J 15/0023 700/258 |
| 2005/0110292 A1 * | 5/2005 | Baumann .............. | B25J 9/0012 294/188 |
| 2006/0242821 A1 * | 11/2006 | Burger ............... | H05K 13/0408 29/740 |
| 2010/0156125 A1 * | 6/2010 | Lee ...................... | B25J 15/0009 294/192 |
| 2012/0072010 A1 * | 3/2012 | Yamada ............. | H01L 21/67259 700/213 |
| 2014/0103673 A1 * | 4/2014 | Nammoto ............. | B25J 13/082 294/106 |
| 2014/0103676 A1 * | 4/2014 | Nammoto ............. | B25J 15/009 294/213 |
| 2014/0197652 A1 * | 7/2014 | Wang .................. | B25J 15/0616 294/185 |

FOREIGN PATENT DOCUMENTS

| | | |
|---|---|---|
| JP | 01-316194 | 12/1989 |
| JP | 03-270886 | 12/1991 |
| JP | 04-171194 | 6/1992 |
| JP | 05-131387 B2 | 5/1993 |

(Continued)

*Primary Examiner* — Gabriela Puig
(74) *Attorney, Agent, or Firm* — Harness, Dickey & Pierce, P.L.C.

(57) ABSTRACT

A robot hand is a robot hand including a finger section. The robot hand includes an elastic body provided in the finger section and including an attracting section that attracts an object and a sensor provided in the finger section and configured to detect deformation of the elastic body.

11 Claims, 23 Drawing Sheets

(56) References Cited

FOREIGN PATENT DOCUMENTS

| JP | 2002-370188 A | 12/2002 |
| JP | 2004-142056 A | 5/2004 |
| JP | 2009-154234 A | 7/2009 |
| JP | 2012-161860 A | 8/2012 |
| JP | 2014-024133 A | 2/2014 |
| JP | 2014-076524 A | 5/2014 |

* cited by examiner

ROBOT HAND, ROBOT, MANUFACTURING METHOD FOR ROBOT HAND

BACKGROUND

1. Technical Field

The present invention relates to a robot hand, a robot, and a manufacturing method for the robot hand.

2. Related Art

A robot hand is attached to the distal end or the like of a robot arm and used for, for example, various kinds of work involving holding and movement of an object (see, for example, JP-A-5-131387 (Patent Literature 1)). The robot hand is expected to have, for example, performance capable of stably holding an object. The robot hand is useful in detecting a contact force or the like with the object. Patent Literature 1 proposes a robot palm pressure sensor including a pressure receiving member formed of an elastic member and filled with incompressible fluid and a pressure detector that detects the pressure of the incompressible fluid.

In the robot palm pressure sensor proposed by Patent Literature 1, although the contact force or the like with the object is detected according to pressure, it is likely that the object gripped by the robot hand falls because of a slip.

SUMMARY

An advantage of some aspects of the invention is to provide a robot hand that can stably hold an object, a robot including the robot hand, and a manufacturing method for the robot hand.

The invention can be implemented as the following aspects or application examples.

APPLICATION EXAMPLE 1

A robot hand according to this application example is a robot hand including a finger section. The robot hand includes: an elastic body provided in the finger section and including an attracting section that attracts an object; and a sensor provided in the finger section and configured to detect deformation of the elastic body.

With such a configuration, the sensor that detects deformation of the elastic body is provided in the finger section in which the elastic body including the attracting section is provided. Therefore, the robot hand can accurately detect an attraction state of the object with a sensor. As a result, the robot hand can accurately control the attraction state of the object. Since a fall or the like of the object is prevented, the robot hand can stably hold the object.

APPLICATION EXAMPLE 2

In the robot hand according to the application example described above, the attracting section may include: a partition wall arranged on the surface of the elastic body; a first fluid chamber partitioned by the partition wall, fluid being stored in the first fluid chamber; and a suction port for sucking the fluid from the first fluid chamber.

With such a configuration, since the partition wall is deformed according to the suction of the fluid from the first fluid chamber and a space between the partition wall and the object is decompressed, the robot hand can attract the object.

APPLICATION EXAMPLE 3

In the robot hand according to the first application example described above, the attracting section may include: a partition wall arranged on the surface of the elastic body; a first fluid chamber partitioned by the partition wall, fluid being stored in the first fluid chamber; and a wire connected to the partition wall in the first fluid chamber.

With such a configuration, since the partition wall is deformed by the wire and a space between the partition wall and the object is decompressed, the robot hand can attract the object.

APPLICATION EXAMPLE 4

In the robot hand according to the second or third application example described above, the sensor may be arranged to be capable of detecting the pressure of a pressure changing section that causes a pressure change according to the deformation of the elastic body. The pressure changing section may include a second fluid chamber in which the fluid is stored.

With such a configuration, the pressure of the second fluid chamber changes according to the deformation of the elastic body and the pressure of the second fluid chamber is detected by the sensor. Therefore, the robot hand can accurately detect the attraction state of the object. As a result, for example, the robot hand can hold the object not to fall and hold the object not to be crushed.

APPLICATION EXAMPLE 5

In the robot hand according to the application example described above, the fluid may include gas, and the sensor may be arranged to be capable of detecting the pressure of the gas.

With such a configuration, in the robot hand, compared with when the fluid is liquid, maintenance due to wetting and adhesion of stain can be simplified or omitted. The robot hand can be easily treated.

APPLICATION EXAMPLE 6

In the robot hand according to the application example described above, a plurality of structures including the elastic bodies and the sensors may be provided in the finger section.

With such a configuration, the robot hand can detect attraction states of the respective elastic bodies with the sensors while holding the object with the plurality of elastic bodies. Therefore, the robot hand can stably hold the object.

APPLICATION EXAMPLE 7

The robot hand according to the application example described above may include a plurality of the finger sections.

With such a configuration, the robot hand can stably hold a variety of objects and has high convenience.

APPLICATION EXAMPLE 8

A robot according to this application example includes: a robot hand including a finger section, an elastic body provided in the finger section and including an attracting section that attracts the object, and a sensor provided in the finger section and configured to detect deformation of the elastic body; and an arm configured to support the robot hand.

In the robot having such a configuration, the sensor that detects deformation of the elastic body is provided in the finger section in which the elastic body including the attracting section is provided. Therefore, the robot can accurately detect an attraction state of the object with a sensor. As a result, the robot can accurately control the attraction state of the object. Since a fall or the like of the object is prevented, the robot can stably hold the object.

APPLICATION EXAMPLE 9

A manufacturing method for a robot hand according to this application example is a manufacturing method for the robot hand according to the application example described above. A process for forming an air gap in which fluid is stored in the robot hand includes: forming a first wall section in a part of the periphery of a space that changes to the air gap; forming, on the first wall section, a sacrificial section in the space that changes to the air gap; forming, on the sacrificial section, a second wall section that surrounds, in conjunction with the first wall section, the space that changes to the air gap; and removing the sacrificial section and forming the space surrounded by the first wall section and the second wall section as the air gap.

With such a manufacturing method for the robot hand, since the sacrificial section is removed and the space surrounded by the first wall section and the second wall section is formed as the air gap, it is possible to form the air gap integrally with a member around the air gap. Therefore, it is possible to, for example, reduce the number of components of the robot hand capable of stably holding an object.

Aspect 1

A robot hand according to this aspect is a robot hand including a finger section. The robot hand includes: an elastic body provided in the finger section and including an attracting section that attracts an object; and a sensor provided in the finger section and configured to detect deformation of the elastic body. The attracting section includes: a suction channel for sucking fluid; and a first fluid chamber that communicates with the suction channel.

With such a configuration, the sensor that detects deformation of the elastic body is provided in the finger section in which the elastic body including the attracting section is provided. Therefore, the robot hand can accurately detect an attraction state of the object with a sensor. As a result, the robot hand can accurately control the attraction state of the object. Since a fall or the like of the object is prevented, the robot hand can stably hold the object.

Aspect 2

In the robot hand according to the aspect described above, the sensor may be arranged to be capable of detecting the pressure of a pressure changing section that causes a pressure change according to the deformation of the elastic body. The pressure changing section may include a second fluid chamber in which the fluid is stored.

With such a configuration, the pressure of the second fluid chamber changes according to the deformation of the elastic body and the pressure of the second fluid chamber is detected by the sensor. Therefore, the robot hand can accurately detect the attraction state of the object. As a result, for example, the robot hand can hold the object not to fall and hold the object not to be crushed.

Aspect 3

In the robot hand according to the aspect described above, the fluid may include gas, and the sensor may be arranged to be capable of detecting the pressure of the gas.

With such a configuration, in the robot hand, compared with when the fluid is liquid, maintenance due to wetting and adhesion of stain can be simplified or omitted. The robot hand can be easily treated.

Aspect 4

In the robot hand according to the aspect described above, a plurality of structures including the elastic bodies and the sensors may be provided.

With such a configuration, the robot hand can detect attraction states of the respective elastic bodies with the sensors while holding the object with the plurality of elastic bodies. Therefore, the robot hand can stably hold the object.

Aspect 5

The robot hand according to the aspect described above may include a plurality of the finger sections.

With such a configuration, the robot hand can stably hold a variety of objects and has high convenience.

Aspect 6

A robot according to this aspect includes: a robot hand including a finger section, an elastic body provided in the finger section and including an attracting section that attracts the object, and a sensor provided in the finger section and configured to detect deformation of the elastic body, the attracting section including a suction channel for sucking the fluid and a first fluid chamber that communicates with the suction channel; and an arm configured to support the robot hand.

In the robot having such a configuration, the sensor that detects deformation of the elastic body is provided in the finger section in which the elastic body including the attracting section is provided. Therefore, the robot can accurately detect an attraction state of the object with a sensor. As a result, the robot can accurately control the attraction state of the object. Since a fall or the like of the object is prevented, the robot can stably hold the object.

Aspect 7

A manufacturing method for a robot hand according to this aspect is a manufacturing method for the robot hand according to the aspect described above. A process for forming an air gap in which fluid is stored in the robot hand includes: forming a first wall section in a part of the periphery of a space that changes to the air gap; forming, on the first wall section, a sacrificial section in the space that changes to the air gap; forming, on the sacrificial section, a second wall section that surrounds, in conjunction with the first wall section, the space that changes to the air gap; and removing the sacrificial section and forming the space surrounded by the first wall section and the second wall section as the air gap.

With such a manufacturing method for the robot hand, since the sacrificial section is removed and the space surrounded by the first wall section and the second wall section is formed as the air gap, it is possible to form the air gap integrally with a member around the air gap. Therefore, it is possible to, for example, reduce the number of components of the robot hand capable of stably holding an object.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
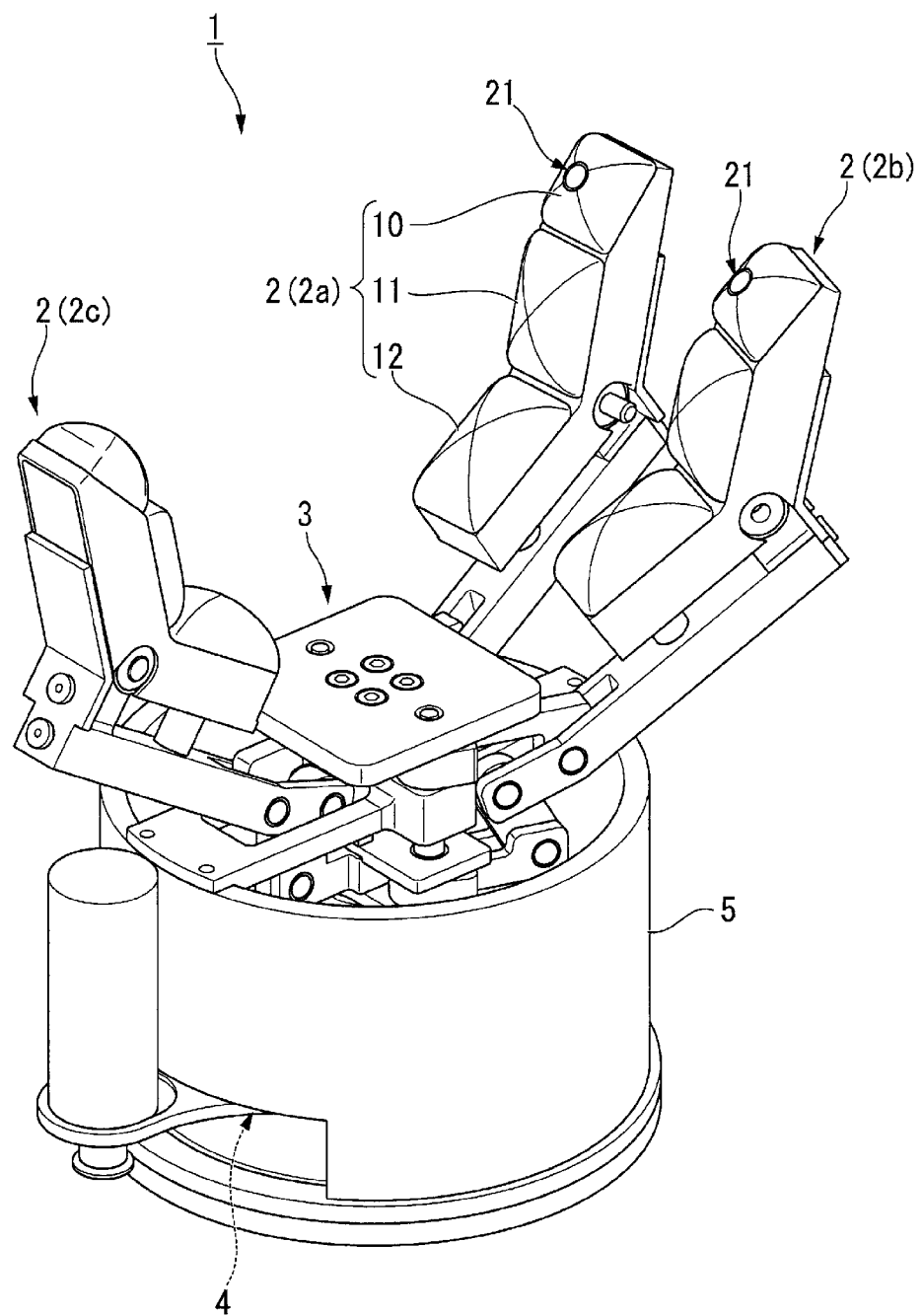
FIG. 1 is a perspective view showing a robot hand according to a first embodiment.

FIG. 1 is a perspective view showing a robot hand 1 according to this embodiment. The robot hand 1 is used as a holding device of an industrial robot that holds a target object such as a tool or a component. The robot hand 1 is also applicable to at least one use among uses other than the industrial robot, for example, a space-related use, a medicine-related use, a food-related use, and play equipment.

The robot hand 1 shown in FIG. 1 includes a finger section 2, a supporting section 3 that supports the finger section 2, and a driving section 4 that drives the supporting section 3. The driving section 4 is turnable around a predetermined axis of the supporting section 3. In this embodiment, the finger section 2 includes a first finger section 2a, a second finger section 2b, and a third finger section 2c. The first finger section 2a, the second finger section 2b, and the third finger section 2c are discretely arrayed in the circumferential direction of the predetermined axis of the supporting section 3. The first finger section 2a, the second finger section 2b, and the third finger section 2c are respectively movable in a direction toward the predetermined axis and a direction away from the predetermined axis and are capable of performing, for example, an action for closing and opening a hand. Consequently, the robot hand 1 is capable of gripping a target object and releasing the gripped target object.

In this embodiment, the insides of the first finger section 2a, the second finger section 2b, and the third finger section 2c are respectively sealed. Therefore, the robot hand 1 can also be used to grip a target object in highly moist places such as the inside of a washer for dishes and the inside of a water tank. The driving section 4 is covered by a cover member 5 and protected from interference with the outside, intrusion of dust, and the like.

The configuration of the finger section 2 is explained. In this embodiment, all of the first finger section 2a, the second finger section 2b, and the third finger section 2c have the same configuration. The configuration of the first finger section 2a is explained below. Explanation of the other finger sections is omitted as appropriate.

The first finger section 2a shown in FIG. 1 includes a distal end section 10, a first pad section 11, and a second pad section 12. The second pad section 12 is a proximal end section of the first finger section 2a with respect to the supporting section 3. The first pad section 11 is connected to the distal end side of the second pad section 12. The distal end section 10 is connected to the distal end side of the first pad section 11.

The distal end section 10, the first pad section 11, and the second pad section 12 are capable of coming into contact with a target object. However, portions of the distal end section 10, the first pad section 11, and the second pad section 12 coming into contact with the target object are discontinuous to one another. That is, the first finger section 2a can support the target object at a plurality of points. For example, the portion of the distal end section 10 which comes in contact with the target object is discontinuous to the portion of the first pad section 11 which comes in contact with the target object. In this embodiment, the distal end section 10 is integrated with the first pad section 11. A position of the distal end section 10 relative to the first pad section 11 is fixed. The distal end section 10 and the first pad section 11 are separate from the second pad section 12. The posture of the distal end section 10 and the first pad section 11 with respect to the second pad section 12 is variable.

Figure 2:
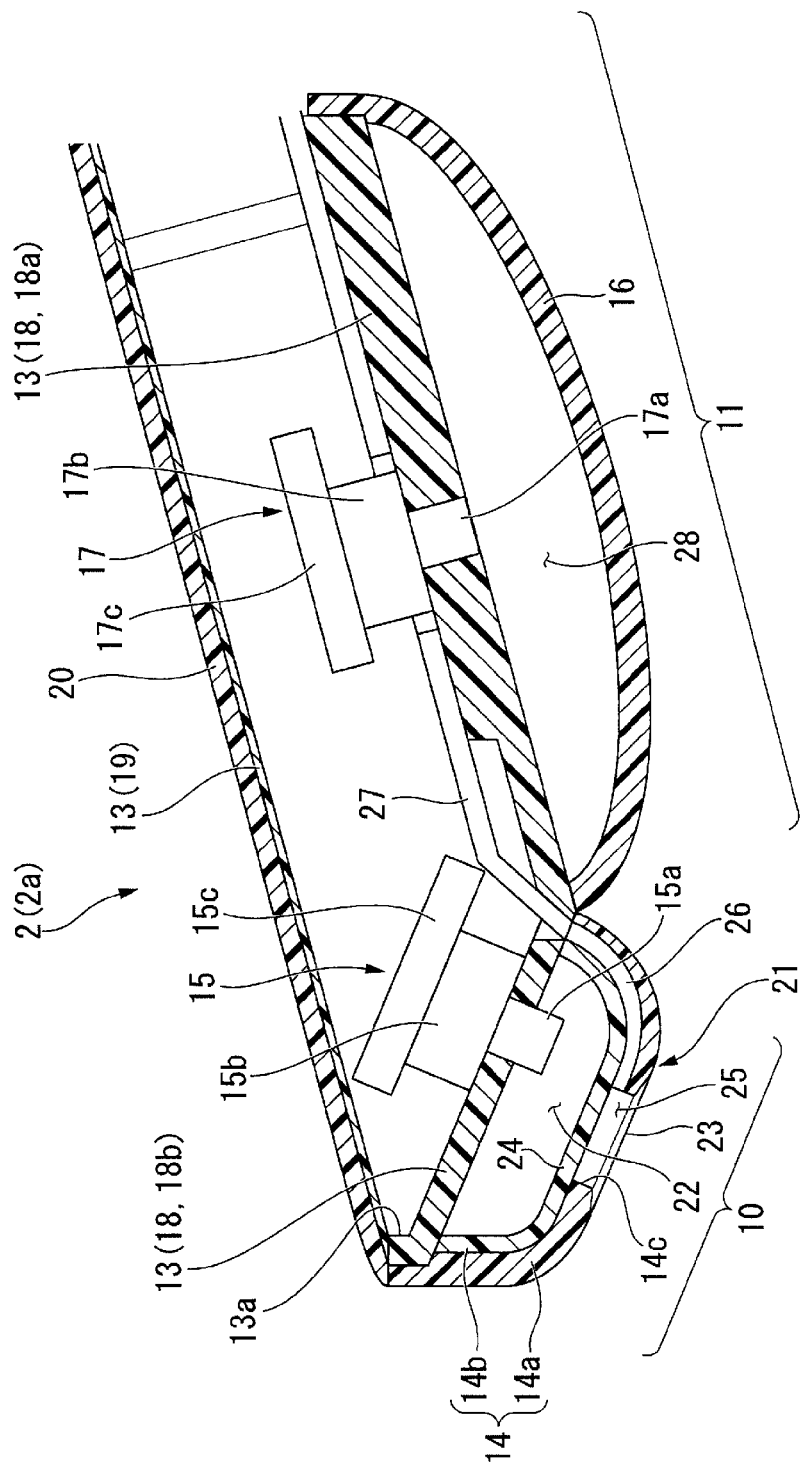
FIG. 2 is a sectional view showing a finger section according to the first embodiment.

FIG. 2 is a sectional view showing the distal end section 10 and the first pad section 11 of the finger section 2 (the first finger section 2a). Note that, in FIG. 2, hatching is omitted as appropriate to clearly show the figure.

The finger section 2 includes a rigid member 13, an elastic body 14 provided in the distal end section 10, a pressure sensor 15 provided in the distal end section 10, an elastic body 16 provided in the first pad section 11, and a pressure sensor 17 provided in the first pad section 11.

The rigid member 13 is a member that forms a framework of the finger section 2 and secures the rigidity of the finger section 2. A material forming the rigid member 13 is selected according to the rigidity required of the finger section 2. The material is a resin material such as polyurethane resin or epoxy resin.

The rigid member 13 includes a box-like section 18 having an opening 13a and a lid section 19 that closes the opening 13a. The space on the inner side of the box-like section 18 is sealed by the lid section 19 and a sealing material 20 to prevent dust or the like from intruding into the space.

The sealing material 20 is provided to extend across the lid section 19 and the periphery of the lid section 19. The box-like section 18 includes a bottom section 18a on the opposite side of the opening 13a and a side section 18b inclined with respect to the bottom section 18a and connected to the lid section 19. The side section 18b is equivalent to the distal end section 10. The elastic body 14 and the pressure sensor 15 are provided in the side section 18b. The bottom section 18a is equivalent to the first pad section 11. The elastic body 16 and the pressure sensor 17 are provided in the bottom section 18a.

The elastic body 14 is a contact section, a part of which comes into contact with a target object. The elastic body 14 includes an attracting section 21 that attracts the target object (an object). The elastic body 14 is formed to be capable of elastically deforming. As a material forming the elastic body 14, a material softer than the rigid member 13 is selected. The material forming the elastic body 14 is resin material such as polyurethane resin.

The elastic body 14 is formed in a protrusion shape projecting toward the outside from the side section 18b of the rigid member 13 and has a hollow structure. The elastic body 14 includes an outer shell section 14a including an outer surface facing the outside of the finger section 2 and an inner shall section 14b provided on the inner side of the outer shell section 14a and including an inner surface facing the inside of the finger section 2.

The outer shell section 14a and the inner shell section 14b are respectively formed in perforated container shapes. Edges of holes of the outer shell section 14a and the inner shell section 14b are in close contact with the side section 18b of the rigid member 13. The holes are closed by the side section 18b. A space surrounded by the elastic body 14 (the inner shell section 14b) and the rigid member 13 (the side section 18b) is a fluid chamber 22 in which fluid is stored.

In this embodiment, the fluid stored in the fluid chamber 22 functioning as a second fluid chamber is gas. The gas is an inert gas such as a nitrogen gas. However, the gas may be the air or other gases. The fluid stored in the fluid chamber 22 may be single-phase fluid of gas or liquid, may be mixed-phase fluid of liquid and gas, or may be mixed-phase fluid including at least one of gas and liquid and a solid such as particles.

In the outer shell section 14a, a through-hole 14c piercing through the outer shell section 14a is formed. An opening of the through-hole 14c facing the outside of the finger section 2 is a suction port 23 opened to the outside of the finger section 2.

The suction port 23 is an end of a suction channel for sucking the fluid from the outside of the first finger section 2a. An opening of the through-hole 14c on the inner side of the finger section 2 is closed by the inner shell section 14b. That is, the inner side and the edge section of the through-hole 14c are formed in a concave section shape having the outer surface of the inner shell section 14b as a bottom surface. A portion of the inner shell section 14b surrounded by the outer shell section 14a between a wall section 24 facing the through-hole 14c and the suction port 23 is formed as a fluid chamber 25 in which the fluid is stored. The fluid chamber 25 functioning as a first fluid chamber communicates with the suction channel including the suction port 23 as an end.

When the pressure of the fluid chamber 22 decreases, the wall section 24 of the inner shell section 14b forming a part of the elastic body 14 is deformed toward the fluid chamber 22 from the fluid chamber 25. Consequently, the capacity of the fluid chamber 22 changes and the pressure of the fluid chamber 22 changes. The fluid chamber 22 is included in a pressure changing section that causes a pressure change according to the deformation of the elastic body 14.

A channel 26 communicating with the fluid chamber 25 is formed on the inside of the elastic body 14. In this embodiment, the channel 26 is formed by closing, with the inner shell section 14b, the side of a groove section formed in the outer shell section 14a. On end of the channel 26 is formed as an intake port opened on the inner wall of the through-hole 14c. The other end of the channel 26 is connected to a pipe 27. The pipe 27 is drawn around the inside of the box-like section 18 of the rigid member 13 and drawn out to the outside of the finger section 2 through a hole formed in the side section 18b of the rigid member 13 and connected to a suction device (not shown in the figure) such as a vacuum pump.

The pressure sensor 15 is a sensor that detects deformation of the elastic body 14 by detecting the pressure of the fluid chamber 22. The pressure sensor 15 includes, for example, a pressure sensing section 15a that senses pressure, a main body section 15b that converts the pressure sensed by the sensing section 15a into an electric signal, and a processing section 15c that processes the electric signal output from the main body section 15b. The pressure sensing section 15a is inserted through a hole that pierces through the side section 18b of the rigid member 13. The pressure sensing section 15a is adjacent (exposed) to the fluid chamber 22 on the inner side of the elastic body 14.

In this embodiment, since the fluid stored in the fluid chamber 22 is gas, occurrence of a failure due to wetting or the like of the pressure sensing section 15a is suppressed. The main body section 15b and the processing section 15c are housed in the box-like section 18 of the rigid member 13. Since the fluid stored in the fluid chamber 22 is gas, compared with when the fluid is liquid, for example, occurrence of failures of the main body section 15b and the processing section 15c due to leakage or the like of the liquid is suppressed.

The elastic body 16 provided in the bottom section 18a of the rigid member 13 is formed to be elastically deformable and formed of, for example, a resin material same as the resin material of the elastic body 14. The elastic body 16 formed in a protrusion shape projecting toward the outer side of the finger section 2 from the bottom section 18a. The elastic body 16 is formed in a perforated container shape. The edge of a hole of the elastic body 16 is closely attached to the bottom section 18a of the rigid member 13. The hole is closed by the bottom section 18a. A space surrounded by the elastic body 16 and the rigid member 13 (the bottom section 18a) is formed as a fluid chamber 28 in which the fluid is stored.

The pressure sensor 17 is a sensor that detects deformation of the elastic body 16 by detecting the pressure of the fluid chamber 28. The pressure sensor 17 includes, for example, a pressure sensing section 17a that senses pressure, a main body section 17b that converts the pressure sensed by the pressure sensing section 17a into an electric signal, and a processing section 17c that processes the electric signal output from the main body section 17b. The pressure sensing section 17a is inserted through a hole that pierces through the bottom section 18a of the rigid member 13. The pressure sensing section 17a is adjacent (exposed) to the fluid chamber 28 on the inner side of the elastic body 16. The main body section 17b and the processing section 17c are housed in the box-shape section 18 of the rigid member 13.

An attracting action by the finger section 2 is explained. The attracting section 21 of the finger section 2 is arranged near a target object when the attracting section 21 attracts the target object. The suction device connected to the pipe 27 sucks the fluid in the fluid chamber 25 via the pipe 27 and the channel 26. Then, the fluid between the attracting section 21 and the target object is sucked from the suction port 23 of the attracting section 21. An air gap between the attracting section 21 and the target object is decompressed. According to the decompression, the target object is attracted by the attracting section 21 to come into contact with the elastic body 14 and sticks to the attracting section 21.

Figure 3:
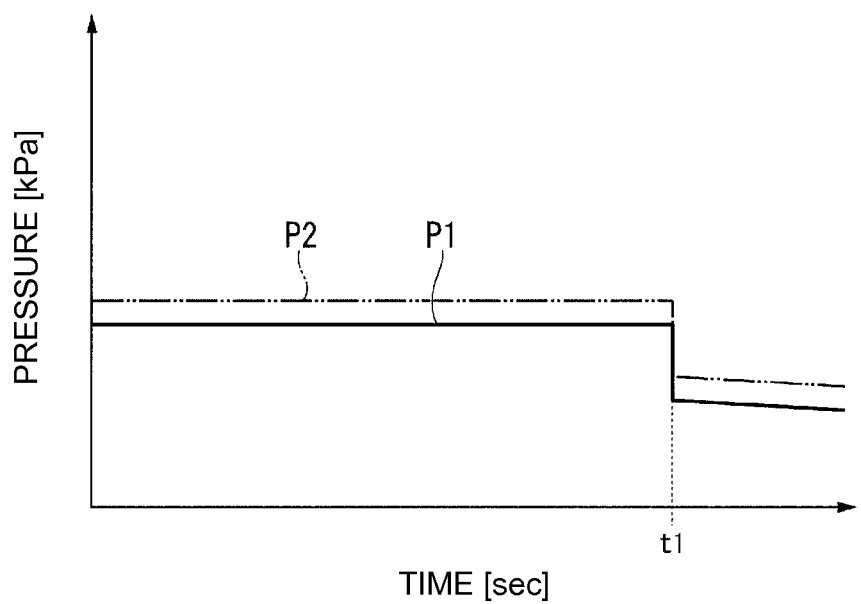
FIG. 3 is a diagram showing an example of pressure changes of fluid chambers during an attracting action.

FIG. 3 is a diagram showing an example of pressure changes of the fluid chamber 22 and the fluid chamber 25 during the attracting action of the finger section 2. In FIG. 3, the ordinate indicates respective pressures [kPa] of the fluid chamber 22 and the fluid chamber 25. The abscissa indicates time [sec] from the start of the suction from the suction port 23. A sign t1 indicates time when the target object is attracted.

Pressure P1 of the fluid chamber 25 is substantially the same as the pressure on the outside of the finger section 2 in a state in which the fluid chamber 25 is opened to the atmosphere. The pressure P1 of the fluid chamber 25 substantially does not change even if the suction is started. Even if the pressure P1 changes, a tilt of the change is gentle. When the target object is attracted at the time t1, the pressure P1 suddenly decreases stepwise. This is because at least a part of the suction port 23 is closed by the attracted target object and the fluid chamber 25 is decompressed by the suction device.

Pressure P2 of the fluid chamber 22 adjacent to the fluid chamber 25 via the wall section 24 is set to positive pressure higher than the pressure P1 of the fluid chamber 25 (the pressure on the outside of the finger section 2). Since the pressure P1 of the fluid chamber 25 substantially does not change before the time t1, the pressure P2 of the fluid chamber 22 also substantially does not change. At the time t1 when the target object is attracted, the wall section 24 (see FIG. 2) of the inner shell section 14b facing the through hole 14c is deformed toward the fluid chamber 25 when the fluid chamber 25 is decompressed. Consequently, the capacity of the fluid chamber 22 increases and the pressure P2 of the fluid chamber 22 decreases. The pressure P2 of the fluid chamber 22 is detected by the pressure sensor 15 shown in FIG. 2. Therefore, it is possible to, for example, determine according to a result of the detection by the pressure sensor 15 whether the target object is attracted. In other words, the robot hand 1 can detect an attraction state (an attracting force, presence or absence of attraction, etc.) of the target object even if the robot hand 1 does not detect the pressure of the fluid chamber 25 adjacent to the target object.

Note that the fluid stored in the fluid chamber 25 is the air, for example, when the finger section 2 works in the air and is water, for example, when the finger section 2 works in the water. In this way, the fluid stored in the fluid chamber 25 may be a single-phase fluid including gas or liquid, may be a mixed-phase fluid including gas and liquid, or may be a mixed-phase fluid including at least one of gas and liquid and a solid such as particles.

In the robot hand 1 in this embodiment having the configuration explained above, the attracting section 21 is provided in the finger section 2, the target object is suppressed from, for example, being attracted by the finger section 2 to slip. Therefore, the robot hand 1 can stably hold (grip) the target object. Since the pressure sensor 15 is provided side by side with the attracting section 21, the robot hand 1 can accurately detect an attraction state of the target object. As a result, the robot hand 1 can accurately control the attraction state (a holding state) of the target object. For example, the robot hand 1 can hold the target object not to fall and hold the target object not to be crushed.

Since the robot hand 1 can accurately detect the attraction state of the target object, for example, a detection system for detecting the attraction state or an operation system for estimating the attraction state can be simplified. It is possible to realize a high function with a simple configuration.

In this embodiment, the pressure of the fluid chamber 22 changes according to the pressure of the fluid chamber 25 and has high sensitivity to presence or absence of attraction of the target object as shown in FIG. 3. Therefore, it is possible to accurately determine presence or absence of attraction of the target object by, for example, monitoring a result of the detection by the pressure sensor 15. The determination can be executed by, for example, comparing the pressure detected by the pressure sensor 15 with a threshold. An operator of the robot hand 1 may execute the determination. An arithmetic unit or the like provided side by side with the robot hand 1 may automatically execute the determination.

In this embodiment, since the fluid chamber 22 is hermetically sealed by the elastic body 14, intrusion of foreign matters such as dust into the fluid chamber 22 is suppressed. Since at least a part (the pressure sensing section 15a) of the pressure sensor 15 is arranged adjacent to the fluid chamber 22, a failure and a malfunction due to intrusion of foreign matters are suppressed. Since the pressure sensor 15 can be protected from foreign matters making use of the elastic body 14 including the attracting section 21, the configuration of the robot hand 1 can be further simplified than when a protection structure for the pressure sensor 15 is separately provided.

In this embodiment, since the robot hand 1 includes a plurality of the finger sections 2, the robot hand 1 can stably hold a variety of objects and has high convenience. Note that the number of the finger sections 2 included in the robot hand 1 may be one. In this embodiment, the first pad section 11 and the second pad section 12 do not include the attracting section 21. However, the first pad section 11 and the second pad section 12 may include the attracting section 21. If a plurality of structures including elastic bodies and sensors are provided in this way, the robot hand 1 can more stably hold the object.

Note that, when the first finger section 2a discretely includes contact sections that come into contact with the target object, the attracting section 21 only has to be provided in at least one of a plurality of contact sections. The number of contact sections including the attracting section 21 is not limited. The attracting section 21 may be provided in any one of the plurality of contact sections. For example, it is also possible that the attracting section 21 is not provided in the distal end section 10 and is provided in the first pad section 11. The number of contact sections that come into contact with the target object in the first finger section 2a is not limited as long as the number is one or more. For example, the number of contact sections may be one. The attracting section 21 only has to be provided in the contact section.

Manufacturing Method for the Robot Hand

A manufacturing method of the robot hand 1 according to this embodiment is explained. FIGS. 4A to 4C, FIGS. 5A to 5C, FIGS. 6A to 6C, and FIGS. 7A to 7C are process diagrams showing a manufacturing method for the robot hand 1 (the finger section 2).

Figure 4A:
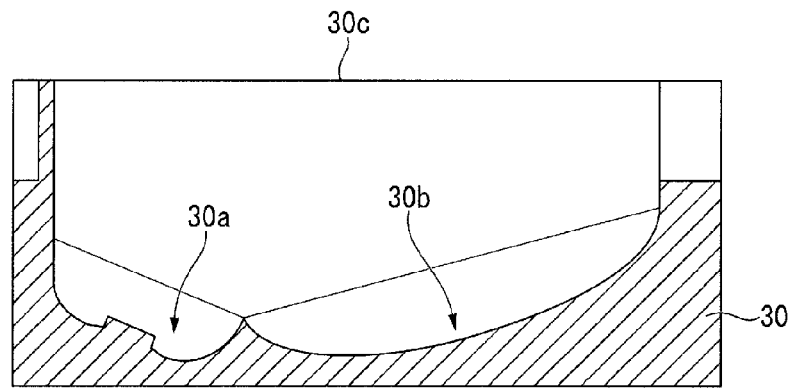
FIGS. 4A to 4C are process diagrams showing a manufacturing method for the robot hand.

To manufacture the finger section 2 of the robot hand 1 according to this embodiment, as shown in FIG. 4A, a die 30 corresponding to the external shapes of the elastic body 14 and the elastic body 16 of the finger section 2 is prepared. The die 30 includes a concave section 30a equivalent to the outer shell section 14a of the elastic body 14 shown in FIG. 2 and a concave section 30b equivalent to the elastic body 16 shown in FIG. 2.

The die 30 is obtained by cutting a base material such as wax (a brazing material). The die 30 is a female die. If a die having a small overhang portion, which forms a shade when viewed from an opening 30c, is used, workability in a later process is improved. For that purpose, the surface including the edge of the concave section 30a and the surface including the edge of the concave section 30b are desirably tilted with respect to the surface including the opening 30c of the die 30 such that the inner side of the concave section 30a and the inner side of the concave section 30b are seen from the opening 30c of the die 30.

Figure 4B:
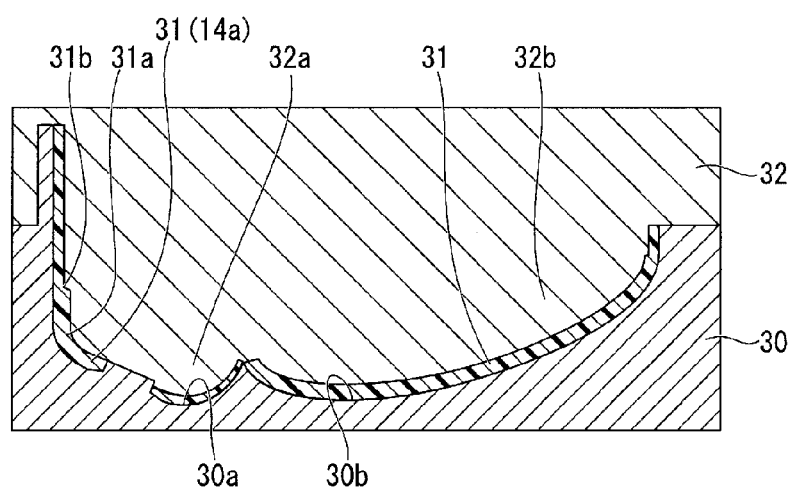

Subsequently, as shown in FIG. 4B, soft resin 31, which is a material forming the elastic body 14 and the elastic body 16, is deposited on the die 30. The soft resin 31 is filled on the inner side of the concave section 30a and the inner side of the concave section 30b. The soft resin 31 is, for example, polyurethane resin having Shore hardness of about 50 A. Examples of the soft resin 31 include polyurethane resin (UR5801/UR5850) manufactured by Axson Japan. In this way, portions equivalent to the external shape of the elastic body 14 and the external shape of the elastic body 16 in the soft resin 31 are molded.

The opposite side of the die 30 in the soft resin 31 is molded using a die 32. The die 32 includes a convex section 32a equivalent to the shape of the inner surface of the outer shell section 14a of the elastic body 14 shown in FIG. 2 and a convex section 32b equivalent to the shape of the inner surface of the elastic body 16.

Incidentally, a groove section equivalent to the channel 26 is formed in the outer shell section 14a shown in FIG. 2. Apart of the inner surface of the outer shell section 14a changes to a part of the inner surface of the channel 26. Therefore, as the convex section 32a, a convex section including a projecting section corresponding to the shape of the groove section of the channel 26 is used.

The soft resin 31 is a portion that changes to the outer shell section 14a of the elastic body 14 and the elastic body 16. The soft resin 31 includes a surface (hereinafter referred to as contact surface) that comes into contact with apart of the finger section 2 other than the outer shell section 14a and the elastic body 16. For example, a portion that changes to the outer shell section 14a in the soft resin 31 includes a contact surface 31a that comes into contact with the inner shell section 14b of the elastic body 14 and a contact surface 31b that comes into contact with the side section 18b of the rigid member 13. The contact surface 31a and the contact surface 31b may be formed in a smooth surface. However, adhesion to other parts is higher when surface roughness is higher. Therefore, in this embodiment, the surface roughness of at least a part of portions for molding the contact surface 31a and the contact surface 31b in the die 32 is set high. The contact surface 31a and the contact surface 31b are molded to have high surface roughness.

Figure 4C:
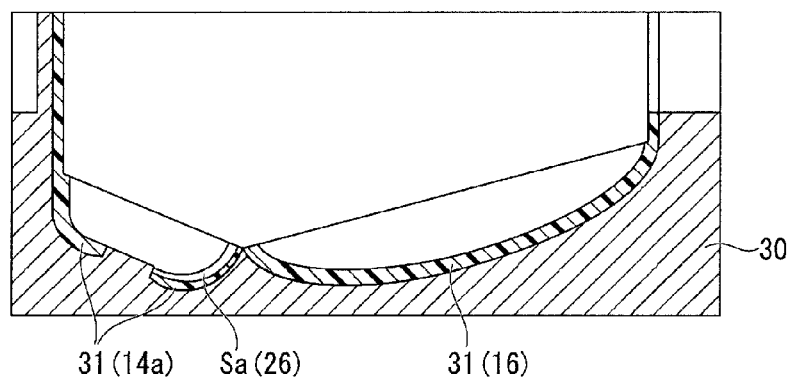

After the soft resin 31 is molded by the die 32, as shown in FIG. 4C, the die 32 is removed from the soft resin 31 while a state in which the soft resin 31 is attached to the die 30 is maintained.

In the molded soft resin 31, the outer shell section 14a of the elastic body 14 is formed as a wall section (a first wall section) in a part of the periphery of a space Sa that changes to the air gap (the channel 26) in which the fluid is stored in the finger section 2 shown in FIG. 2.

Figure 5A:
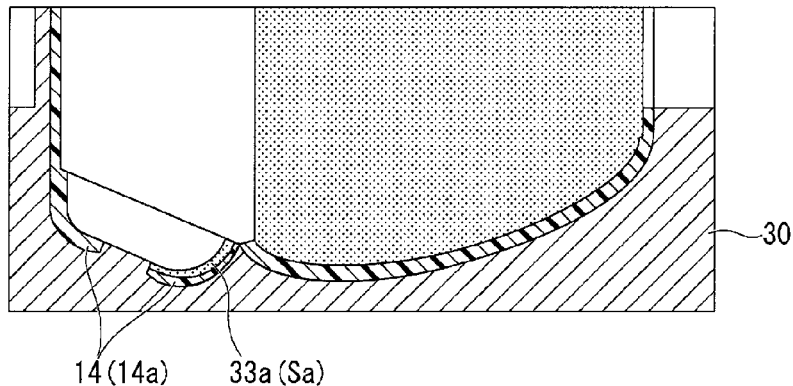
FIGS. 5A to 5C are process diagrams following FIG. 4C.

Subsequently, as shown in FIG. 5A, a sacrificial section 33a is formed in the space Sa, which changes to the channel 26, on the outer shell section 14a of the elastic body 14. A sacrificial material that changes to the sacrificial section 33a is changed to a liquid state by a temperature rise. The sacrificial material in the liquid state is filled in the space Sa. The liquid-state material is cooled to about the normal temperature to be solidified and is molded by cutting, die-molding, or the like according to necessity. The surface shape of the sacrificial section 33a is molded to match the shape of the outer surface of the inner shell section 14b of the elastic body 14 shown in FIG. 2.

Figure 5B:
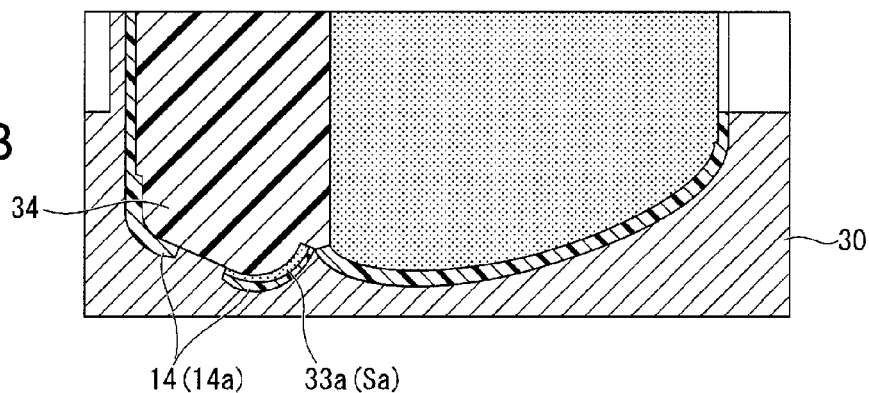
Figure 5C:
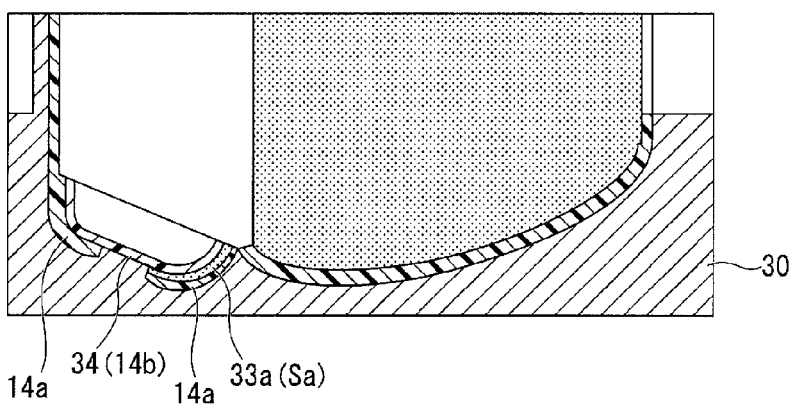

Subsequently, as shown in FIG. 5B, soft resin 34 is deposited on the outer shell section 14a of the elastic body 14 and on the sacrificial section 33a as the material forming the inner shell section 14b of the elastic body 14 shown in FIG. 2. As shown in FIG. 5C, the soft resin 34 is molded by cutting or die-molding to form the inner shell section 14b of the elastic body 14. A part of the inner shell section 14b is formed on the sacrificial section 33a of the space Sa, which changes to the channel 26, and is formed as a wall section (a second wall section) that surrounds the space Sa in conjunction with the outer shell section 14a. The sacrificial section 33a is liquidized according to, for example, a temperature rise and removed from a space between the outer shell section 14a and the inner shell section 14b. The space Sa, from which the sacrificial section 33a is removed, changes to an air gap and changes to the channel 26 shown in FIG. 2.

Incidentally, the inner shell section 14b of the elastic body 14 is also a wall section (a first wall section) formed in a part of the periphery of the air gap (the fluid chamber 22) in which the fluid is stored in the finger section 2 shown in FIG. 2. The elastic body 16 is also a wall section (a first wall section) formed in a part of the periphery of the air gap (the fluid chamber 28 shown in FIG. 2) in which the fluid is stored in the finger section 2. The fluid chamber 22 and the fluid chamber 28 are formed in a later stage making use of the wall sections.

Figure 6A:
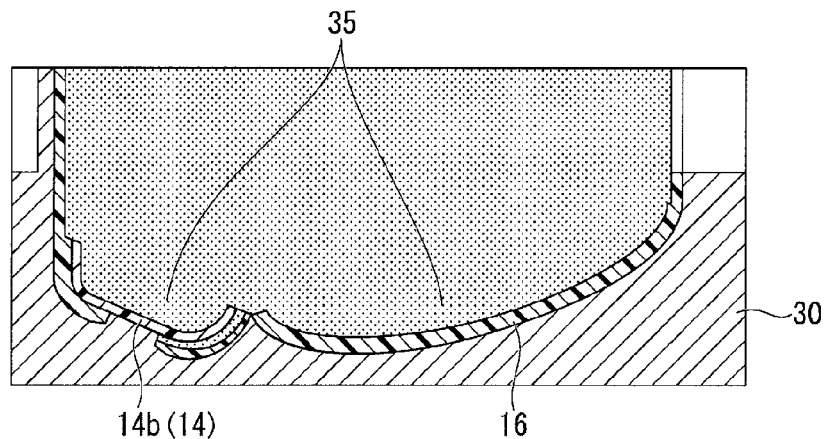
FIGS. 6A to 6C are process diagrams following FIG. 5C.

Subsequently, as shown in FIG. 6A, a sacrificial material is deposited on the inner shell section 14b of the elastic body 14 and on the elastic body 16 to form a sacrificial section 35. The sacrificial section 35 can be formed in the same manner as the sacrificial section 33a shown in FIG. 5A.

Figure 6B:
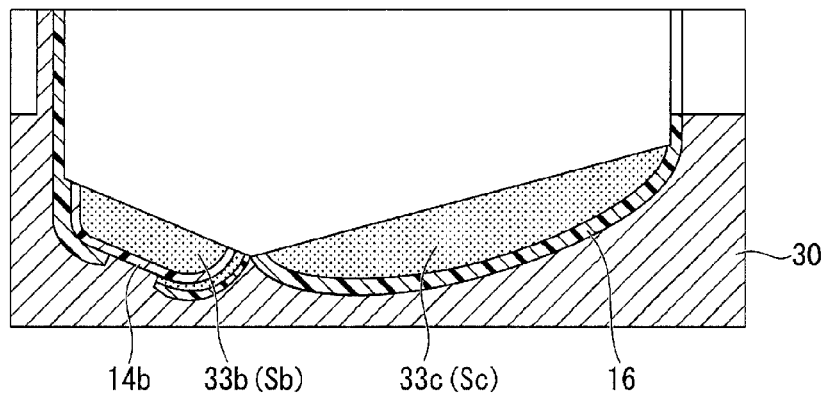

As shown in FIG. 6B, the sacrificial section 35 is formed by cutting, die-molding, or the like, whereby a sacrificial section 33b is formed in a space Sb, which changes to the fluid channel 22, on the inner shell section 14b and a sacrificial section 33c is formed in a space Sc, which changes to the fluid chamber 28, on the elastic body 16. The surface shape of the sacrificial section 33b is molded to match the surface shape of the side section 18b of the rigid member 13 shown in FIG. 2. The surface shape of the sacrificial section 33c is molded to match the surface shape of the bottom section 18a of the rigid member 13.

Figure 6C:
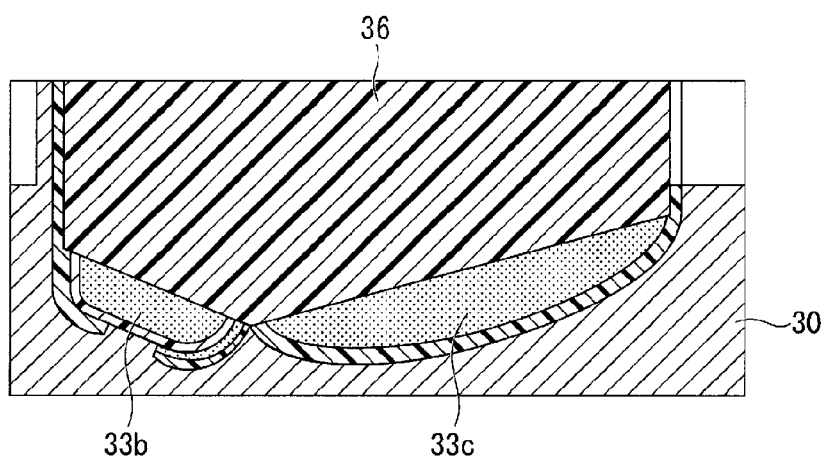

Subsequently, as shown in FIG. 6C, hard resin 36 is deposited on the sacrificial section 33b and on the sacrificial section 33c as a material forming the rigid member 13 shown in FIG. 2. Moisture deriving from the sacrificial material in the liquid state and moisture in the atmosphere sometimes adhere to the sacrificial section 33b, the sacrificial section 33c, and the like. Therefore, if the moisture of the sacrificial section 33b and the sacrificial section 33c is removed by decompression or the like prior to the deposit of the hard resin 36, for example, occurrence of air bubbles due to moisture of the hard resin 36 is suppressed.

Figure 7A:
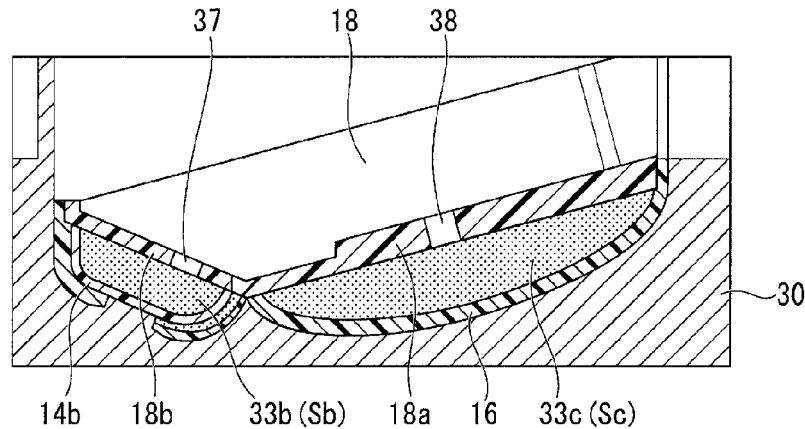
FIGS. 7A to 7C are process diagrams following FIG. 6C.

Subsequently, as shown in FIG. 7A, the box-like section 18 of the rigid member 13 is formed by molding the hard resin 36 with cutting or the like. The side section 18b of the box-like section 18 is formed on the sacrificial section 33b of the space Sb, which changes to the fluid chamber 22, and is a wall section (a second wall section) that surrounds the space Sb in conjunction with the inner shell section 14b. An attaching hole 37 for the pressure sensor 15 is formed in the side section 18b of the box-like section 18. The attaching hole 37 pierces through the side section 18b and communicates with the sacrificial section 33b. The bottom section 18a of the box-like section 18 is formed on the sacrificial section 33c of the space Sc, which changes to the fluid chamber 28, and is a wall section (a second wall section) that surrounds the space Sb in conjunction with the elastic body 16. An attaching hole 38 for the pressure sensor 17 is formed in the bottom section 18a of the box-like section 18. The attaching hole 38 pierces through the bottom section 18a and communicates with the sacrificial section 33c.

Figure 7B:
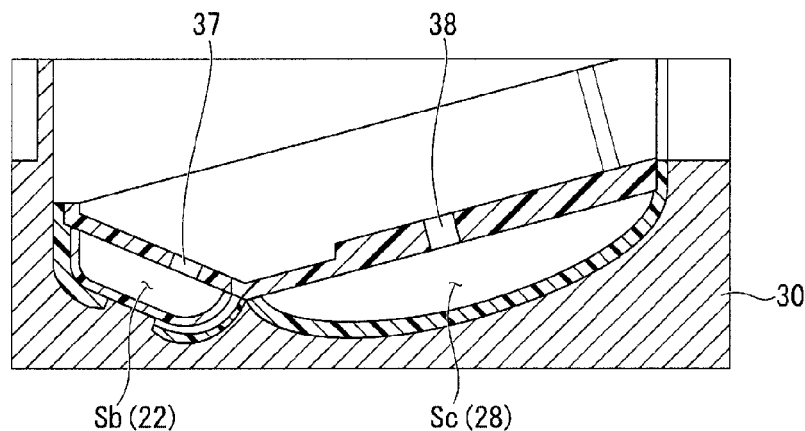

Subsequently, as shown in FIG. 7B, the sacrificial section 33b and the sacrificial section 33c shown in FIG. 7A are removed. The sacrificial section 33b is removable via the attaching hole 37 in a state in which the sacrificial section 33b is fluidized by, for example, a temperature rise. Similarly, the sacrificial section 33c is removable via the attaching hole 38 in a state in which the sacrificial section 33c is fluidized by, for example, a temperature rise. The space Sb from which the sacrificial section 33b is removed and the space Sc from which the sacrificial section 33c is removed are respectively change to air gaps and change to the fluid chamber 22 and the fluid chamber 28 shown in FIG. 2.

Figure 7C:
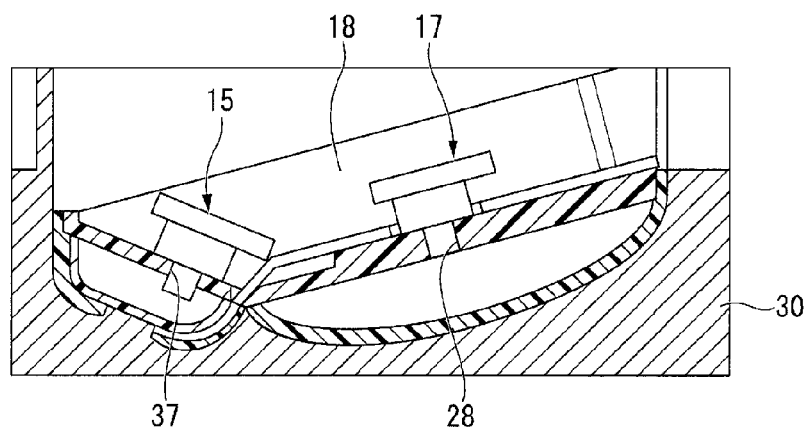

Subsequently, as shown in FIG. 7C, the pressure sensor 15 is attached to the attaching hole 37 and the pressure sensor 17 is attached to the attaching hole 38. The pipe 27 is connected to the channel 26. After the sections are housed in the box-like section 18 of the rigid member 13 in this way, the finger section 2 is obtained by, for example, sealing the box-like section 18 with the lid section 19 and the sealing material 20 shown in FIG. 2. The sealing material 20 can be formed by, for example, soft resin like the elastic body 14.

With the manufacturing method for the robot hand 1 according to this embodiment, it is possible to manufacture the robot hand 1 that can stably hold an object. In the process for forming the air gap in which the fluid is stored, since the channel 26 is formed by removing the sacrificial section 33a of the space Sa shown in FIG. 5C, the channel 26 can be formed integrally with the elastic body 14. Since the fluid chamber 22 is formed by removing the sacrificial section 33b of the space Sb shown in FIGS. 7A and 7B, the fluid chamber 22 can be formed integrally with the elastic body 14 and the rigid member 13. Similarly, since the fluid chamber 28 is formed by removing the sacrificial section 33c of the space Sc, the fluid chamber 28 can be formed integrally with the elastic body 16 and the rigid member 13. Since the air gap in which the fluid is stored is formed integrally with the member around the air gap, it is possible to suppress manufacturing costs and realize a high function with a simple configuration.

Note that the molding of the elastic body 14 may be performed by cutting or the like besides die-molding. However, the elastic body 14 is less easily damaged by the die-molding compared with the cutting. Therefore, it is easy to reduce the thickness of the elastic body 14. It is possible to, for example, improve flexibility of the elastic body 14. Consequently, adhesion to the target object is improved. It is possible to stably hold the target object. By forming the elastic body 14 flexible, for example, it is easy to apply the elastic body 14 to a target object that is easily damaged such as a film. Since the elastic body 14 is easily deformed, it is possible to substantially improve the sensitivity of the pressure sensor 15.

Second Embodiment

A second embodiment is explained. In this embodiment, components same as the components in the first embodiment are denoted by reference numerals and signs same as the reference numerals and signs in the first embodiment. Explanation of the components is simplified or omitted.

Robot Hand

Figure 8:
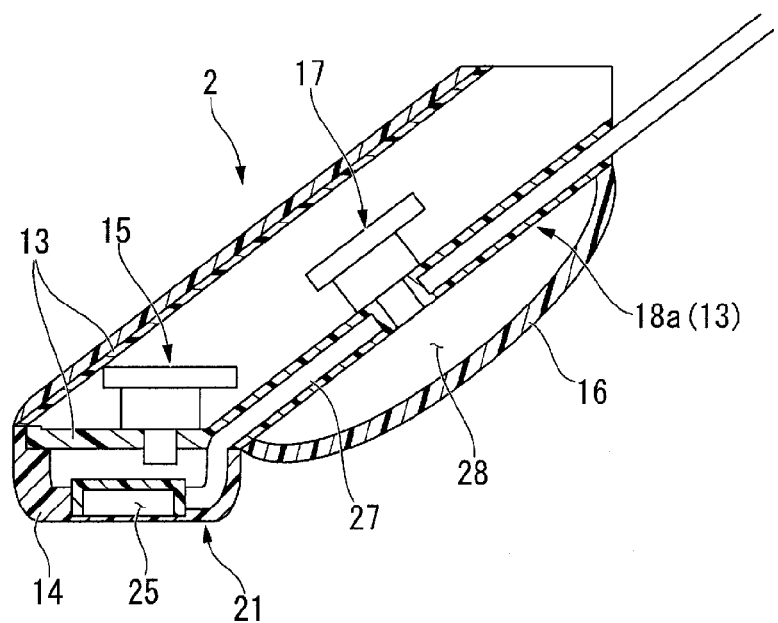
FIG. 8 is a sectional view showing a finger section of a robot hand according to a second embodiment.
Figure 9:
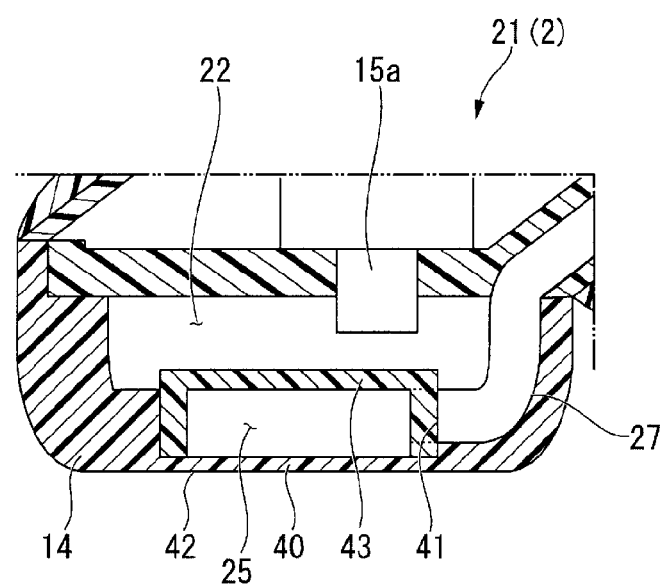
FIG. 9 is a sectional view showing an attracting section of the finger section according to the second embodiment.

FIG. 8 is a sectional view showing the finger section 2 of a robot hand according to this embodiment. FIG. 9 is a sectional view showing the attracting section 21 of the finger section 2. The finer section 2 in this embodiment is different from the first embodiment in the configuration of the attracting section 21. The attracting section 21 shown in FIG. 9 includes a partition wall 40 arranged on the outer surface of the elastic body 14, the fluid chamber 25 adjacent to the partition wall 40 on the inner side of the elastic body 14, and a suction port 41 for sucking fluid from the fluid chamber 25. The suction port 41 is connected to a suction device (not shown in the figure) via the pipe 27. When the fluid is sucked from the fluid chamber 25 via the suction port 41, the pressure of the fluid chamber 25 decreases. In this embodiment, the fluid stored in the fluid chamber 25 is gas. However, the fluid may be a single-phase fluid of liquid or may be a mixed-phase fluid.

The partition wall 40 is a part of the elastic body 14 and is thinner than the other portions of the elastic body 14. A surface 42 in contact with a target object in the elastic body 14 is substantially flat. The outer surface of the partition wall 40 is a part of the surface 42. When the pressure of the fluid chamber 25 is pressure (negative pressure) lower than the pressure of the outside of the finger section 2, the partition wall 40 is deformed (bent) toward the fluid channel 25. When the partition wall 40 is deformed toward the fluid chamber 25 in a state in which the target object is in contact with the surface 42, an air gap between the partition wall 40 and the target object expands. The target object is attracted to the attracting section 21 by negative pressure of the air gap.

As in the first embodiment, the pressure sensing section 15a of the pressure sensor 17 is adjacent to the fluid chamber 22. The fluid chamber 22 is partitioned from the fluid chamber 25 by a partition wall 43 and is kept at positive pressure. The partition wall 43 is a bottomed hollow columnar shape. The inside of the partition wall 43 is the fluid chamber 25. The edge of an opening of the partition wall 43 is in contact with the partition wall 40. The bottom section of the partition wall 43 forms a partition of the fluid chamber 22 and the fluid chamber 25.

The partition wall 43 in this embodiment is formed of a hard material less easily deformed than the elastic body 14. For example, the partition wall 43 is formed of a material same as the rigid member 13. A deformation amount of the partition wall 43 due to a pressure difference between the fluid chamber 22 and the fluid chamber 25 is small. It is difficult to reduce the pressure difference. As a result, even in a state in which the fluid chamber 25 changes to negative pressure, the pressure of the fluid chamber 22 is kept at positive pressure. The positive pressure serves as a cushion when the elastic body 14 comes into contact with the target object. Therefore, it is possible to softly bring the elastic body 14 into contact with the target object.

Figure 10:
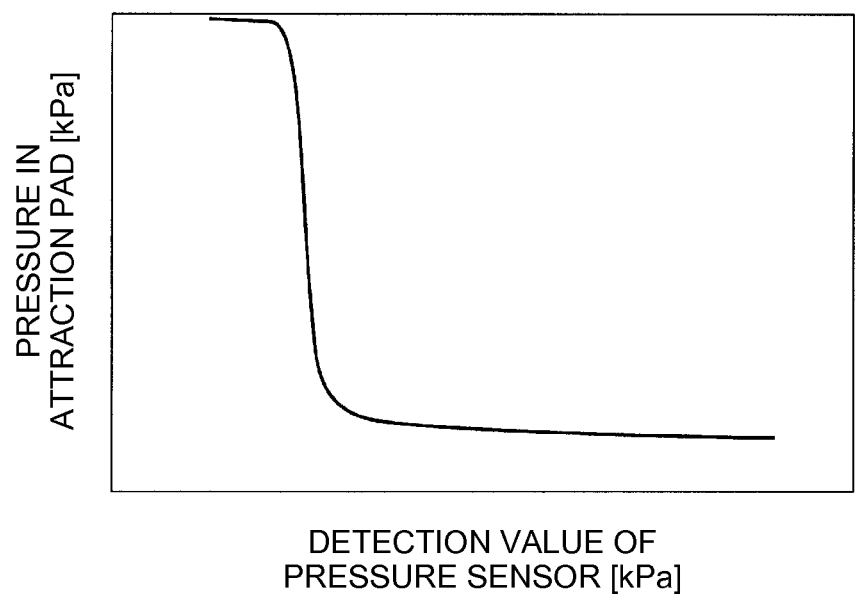
FIG. 10 is a diagram showing a relation between an attracting force of the attracting section and a detection value of a pressure sensor.

FIG. 10 is a diagram showing a relation between an attracting force of the attracting section 21 and a detection value of the pressure sensor 15. The ordinate of FIG. 10 indicates the pressure in an attraction pad, that is, pressure [kPa] between the partition wall 40 and the target object. The ordinate indicates that, as the pressure is lower, the attraction force is larger. The abscissa indicates pressure detected by the pressure sensor 15, that is, pressure [kPa] of the fluid chamber 22.

The attracting section 21 shown in FIG. 9 deforms the wall section 24 by decompressing the fluid chamber 25 with suction from the suction port 41 in a state in which the surface 42 of the elastic body 14 is pressed against the target object. The attracting section 21 attracts the target object by changing the air gap between the partition wall 40 and the target object to negative pressure. When the target object is attracted, as force for pressing the surface 42 of the elastic body 14 against the target object is increased, the elastic body 14 is further deformed toward the rigid member 13 and the pressure of the fluid chamber 22 increases. On the other hand, a gap between the wall section 24 and the target object decreases. The pressure between the wall section 24 and the target object conspicuously decreases when the gap is expanded by the deformation of the partition wall 40. In this way, there is a relation between an attracting force of the attracting section 21 and a detection result of the pressure sensor 15. Therefore, it is possible to detect the attracting force of the attracting section 21 on the basis of the detection result of the pressure sensor 15. It is possible to, for example, accurately control an attracting force.

In the robot hand 1 in this embodiment having the configuration explained above, the pressure sensor 15 is provided side by side with the attracting section 21. Therefore, the robot hand 1 can accurately detect an attraction state of the target object and stably hold the target object.

Manufacturing Method for the Robot Hand 1

A manufacturing method for the robot hand according to this embodiment is explained with reference to the robot hand 1. FIGS. 11A to 11C, FIGS. 12A to 12D, FIGS. 13A to 13D, and FIGS. 14A to 14D are process diagrams showing the manufacturing method for the robot hand 1 (the finger section 2). Note that explanation concerning processes common to the first embodiment is simplified or omitted.

Figure 11A:
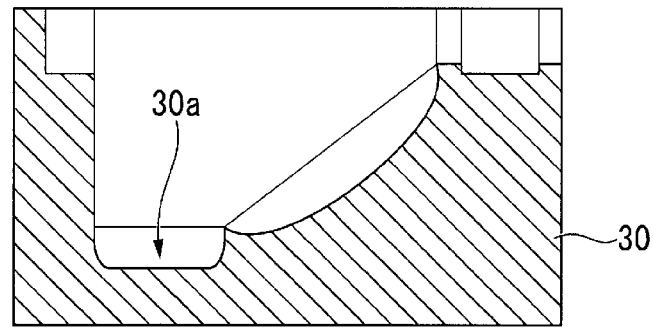
FIGS. 11A to 11C are process diagrams showing a manufacturing method for the robot hand.
Figure 11B:
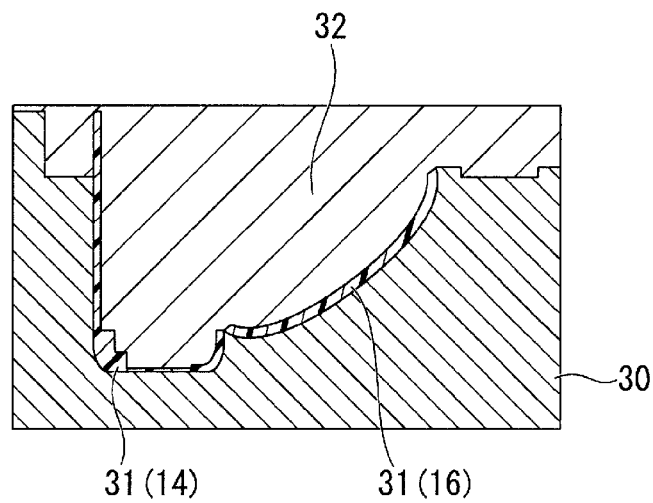
Figure 11C:
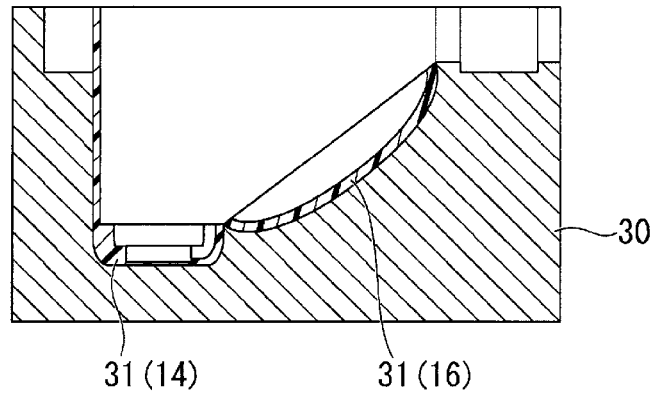

To manufacture the finger section 2 in this embodiment, as shown in FIG. 11A, the die 30 corresponding to the external shapes of the elastic body 14 and the elastic body 16 of the finger section 2 (see FIG. 8) is prepared. In this embodiment, the surface 42 of the elastic body 14 is substantially plane. In the die 30, the bottom surface of the concave section 30a equivalent to the outer shell section 14a of the elastic body 14 is substantially plane to correspond to the surface 42 of the elastic section 14. Subsequently, as shown in FIG. 11B, the soft resin 31 is deposited on the die 30. The opposite side of the die 30 in the soft resin 31 is molded using the die 32. Consequently, the elastic body 14 and the elastic body 16 are formed. Subsequently, as shown in FIG. 11C, the die 32 is removed from the soft resin 31 while a state in which the soft resin 31 is fit in the die 30 is maintained.

Figure 12A:
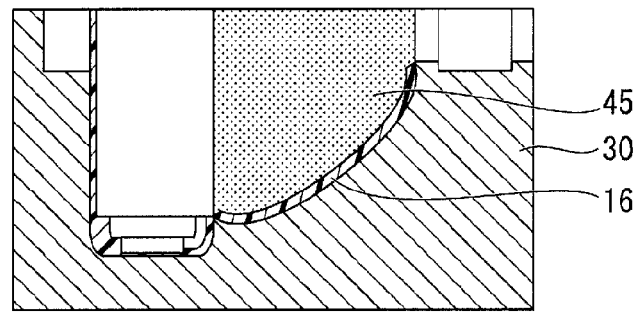
FIGS. 12A to 12D are process diagrams following FIG. 11C.
Figure 12B:
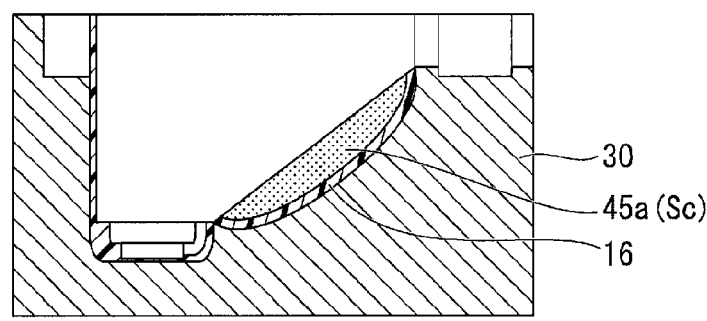

Subsequently, as shown in FIG. 12A, a sacrificial material is deposited on the elastic body 16 to form a sacrificial section 45. Subsequently, as shown in FIG. 12B, the sacrificial section 45 is molded by cutting or die-molding. A sacrificial section 45a is formed in the space Sc, which changes to the fluid chamber 28, between the elastic body 16 and the bottom section 18a of the rigid member 13 shown in FIG. 8.

Figure 12C:
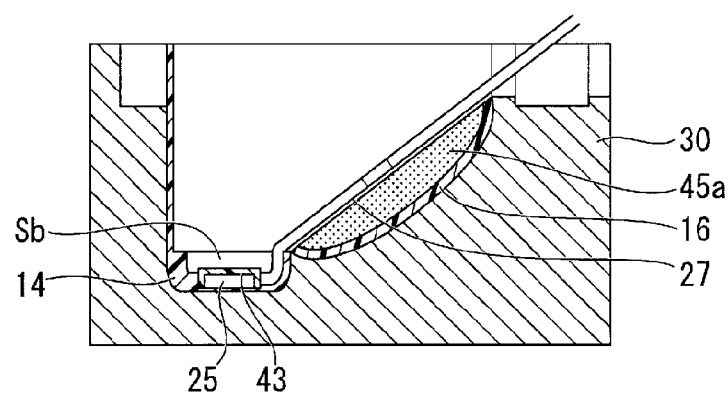
Figure 12D:
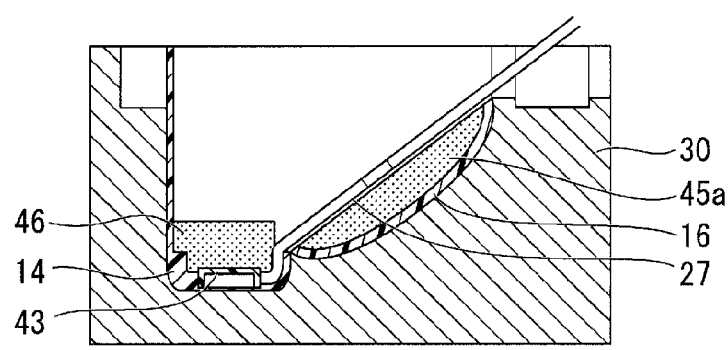
Figure 13A:
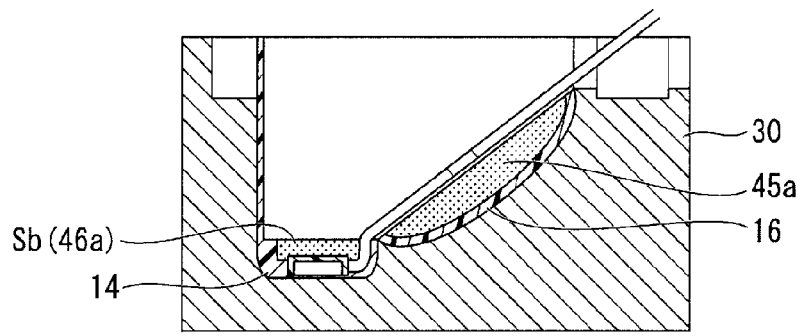
FIGS. 13A to 13D are process diagrams following FIG. 12D.

Subsequently, as shown in FIG. 12C, the partition wall 43 is formed of hard resin or the like in the elastic body 14. The partition wall 43 is formed as a wall section in a part of the periphery of the space Sb that changes to the fluid chamber 22 later. The pipe 27 communicating with the fluid chamber 25 on the inner side of the partition wall 43 is attached. The pipe 27 is arranged to be drawn around on the sacrificial section 45a as appropriate to avoid interference with other members, for example, avoid an attached position of the pressure sensor 17. Subsequently, as shown in FIG. 11D, the sacrificial material is deposited on the partition wall 43 and on the pipe 27 to form a sacrificial section 46. Subsequently, the sacrificial section 46 is molded by cutting or die-molding. As shown in FIG. 13A, a sacrificial section 46a is formed in the space Sb, which changes to the fluid chamber 22, between the elastic body 14 and the side section 18b of the rigid member 13 shown in FIG. 9.

Figure 13B:
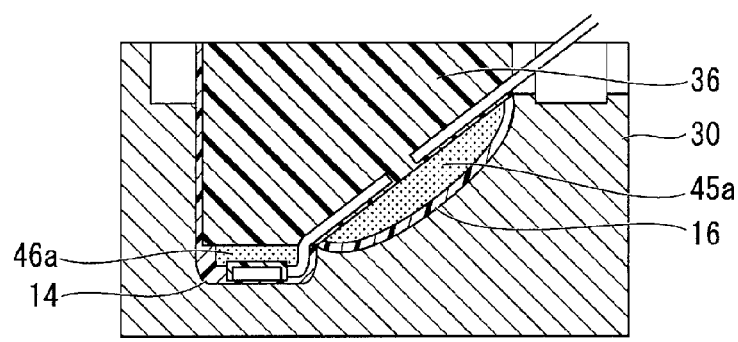
Figure 13C:
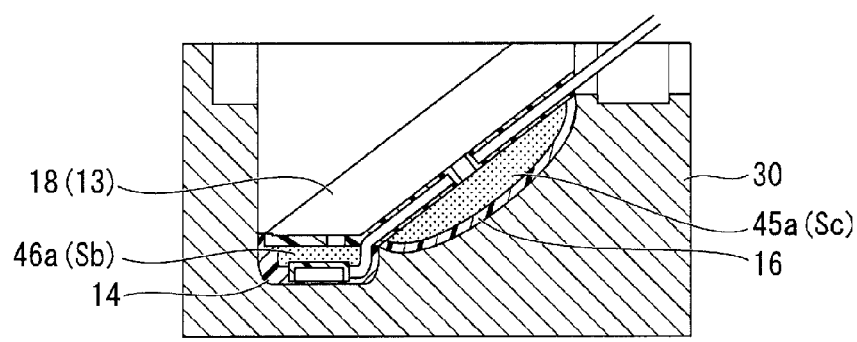
Figure 13D:
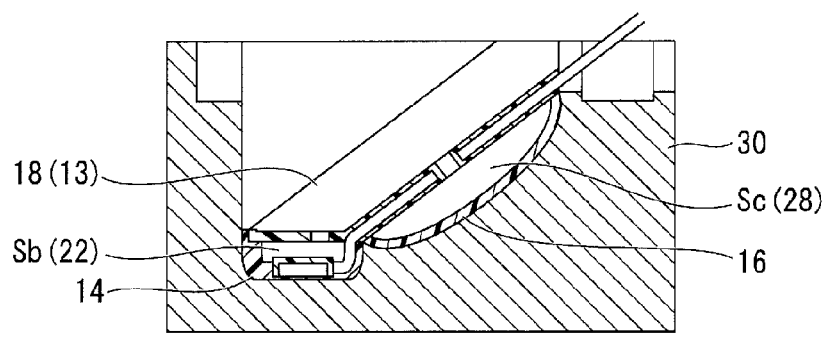

Subsequently, as shown in FIG. 13B, the hard resin 36 is deposited on the sacrificial section 45a and on the sacrificial section 46a as a material forming the rigid member 13 shown in FIG. 8. Subsequently, the hard resin 36 is molded by cutting or the like. As shown in FIG. 13C, the box-like section 18 of the rigid member 13 is formed. Subsequently, as shown in FIG. 13D, the sacrificial section 45a is removed to change the space Sc occupied by the sacrificial section 45a to the fluid chamber 28. The sacrificial section 46a is removed to change the space Sb occupied by the sacrificial section 46a to the fluid chamber 22.

Figure 14A:
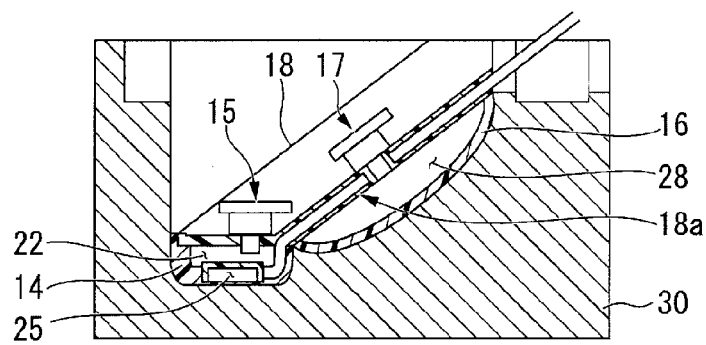
FIGS. 14A to 14D are process diagrams following FIG. 13D.
Figure 14B:
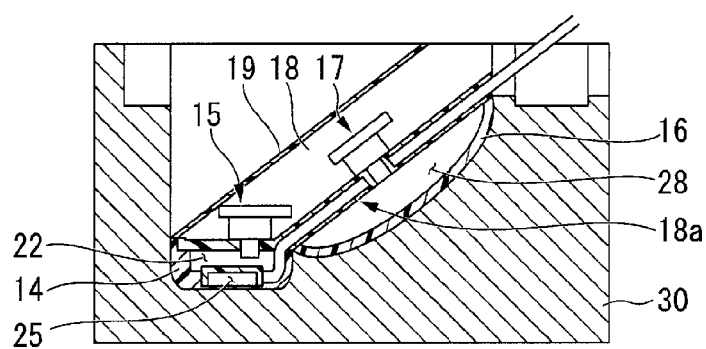
Figure 14C:
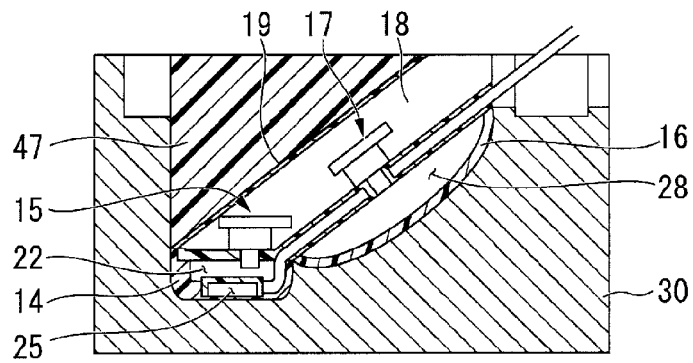
Figure 14D:
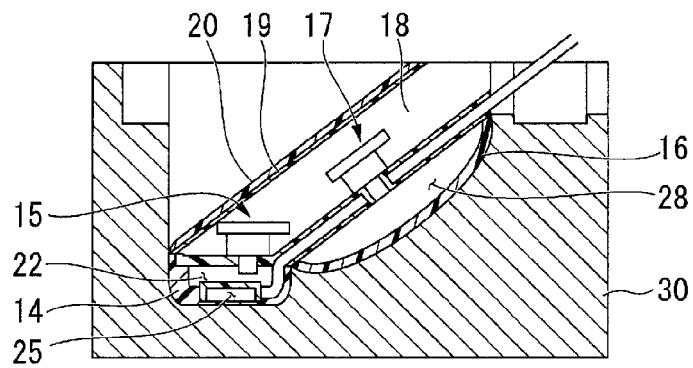

Subsequently, as shown in FIG. 14A, the pressure sensor 15 is attached to the side section 18b of the box-like section 18. The pressure sensor 17 is attached to the bottom section 18a of the rigid member 13. Subsequently, as shown in FIG. 14B, the lid section 19 is bonded to the box-like section 18 of the rigid member 13 to seal the inner side of the box-like section 18. Subsequently, as shown in FIG. 14C, the soft resin 47 is deposited on the lid section 19. Subsequently, the soft resin 47 is molded by cutting or the like. As shown in FIG. 14D, the sealing material 20 is formed. The finger section 2 shown in FIG. 8 is obtained by, for example, removing the die 30.

With the manufacturing method for the robot hand 1 according to this embodiment explained above, it is possible to manufacture the robot hand 1 that can stably hold an object. In this embodiment, in the process for forming the air gap in which the fluid is stored, since the fluid chamber 28 is formed by removing the sacrificial section 45a shown in FIGS. 13C and 13D, the fluid chamber 28 can be formed integrally with the elastic body 16 and the rigid member 13. Similarly, since the fluid chamber 22 is formed by removing the sacrificial section 46a, the fluid chamber 22 can be formed integrally with the elastic body 14 and the rigid member 13. Since the air gap in which the fluid is stored is formed integrally with the members around the air gap in this way, it is possible to suppress manufacturing costs and realize a high function with a simple configuration.

Third Embodiment

A third embodiment is explained. In this embodiment, components same as the components in the embodiments explained above are denoted by reference numerals and signs same as the reference numerals and signs in the embodiments. Explanation of the components is simplified or omitted.

Robot Hand

Figure 15:
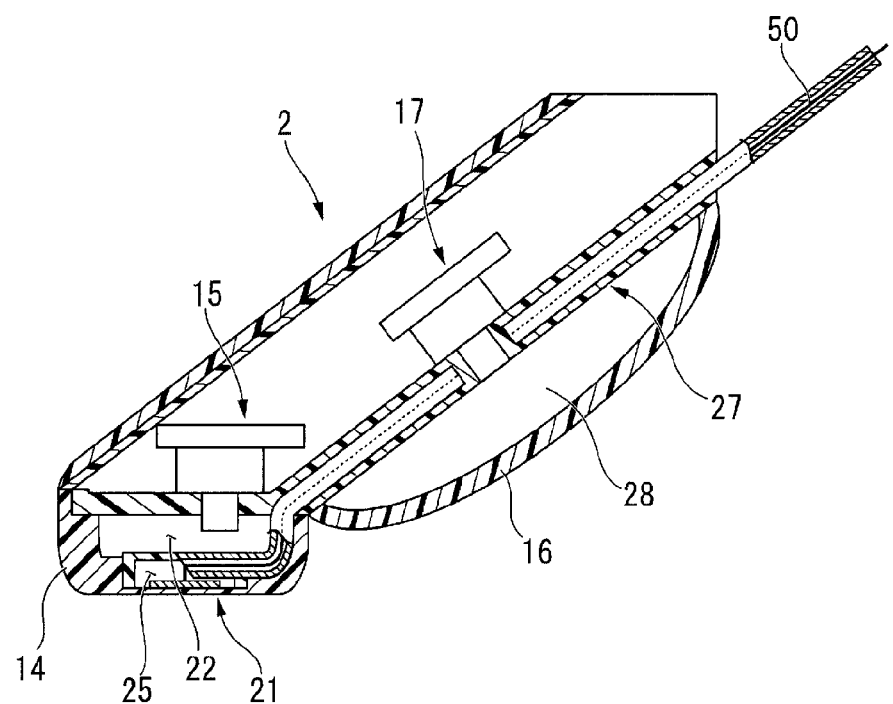
FIG. 15 is a sectional view showing a finger section of a robot hand according to a third embodiment.
Figure 16:
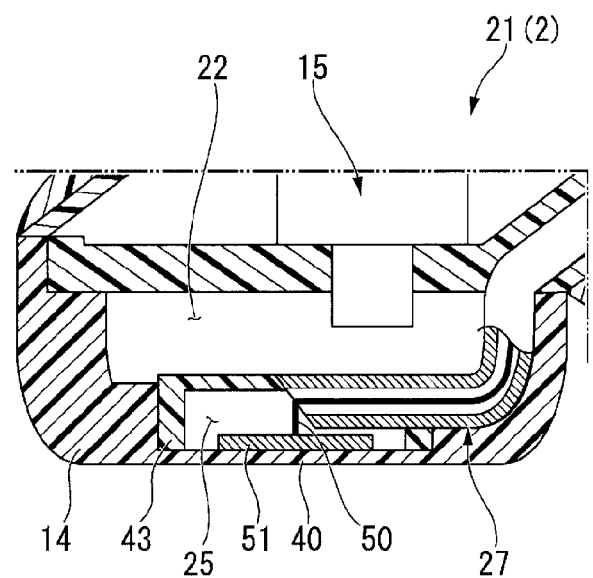
FIG. 16 is a sectional view showing an attracting section of the finger section according to the third embodiment.

FIG. 15 is a sectional view showing the finger section 2 of a robot hand according to this embodiment. FIG. 16 is a sectional view showing the attracting section 21 of the finger section 2. The finger section 2 in this embodiment is the same as the second embodiment in that the finger section 2 attracts a target object according to deformation of the partition wall 40. However, the finger section 2 in this embodiment is different from the second embodiment in a mechanism for deforming the partition wall 40.

The attracting section 21 shown in FIG. 16 includes a wire 50 connected to the partition wall 40 in the fluid chamber 25.

A reinforcing section 51 is provided on the inner surface of the partition wall 40 facing the fluid chamber 25. The wire 50 is attached to the reinforcing section 51. That is, one end of the wire 50 is connected to the partition wall 40 via the reinforcing section 51. The reinforcing section 51 is formed of a material harder than the partition wall 40 (the elastic body 14), for example, hard resin same as the rigid member 13. The other end of the wire 50 is drawn out to the outside of the finger section 2 through the pipe 27 shown in FIG. 15. In this embodiment, the partition wall 40 is deformed toward the fluid chamber 25 by being pulled by the wire 50. Consequently, an air gap between the partition wall 40 and the target object is decompressed. The target object is attracted to the attracting section 21.

In the robot hand 1 according to this embodiment having the configuration explained above, the pressure sensor 15 is provided side by side with the attracting section 21. Therefore, the robot hand 1 can accurately detect an attraction state of the target object. It is possible to realize a high function with a simple configuration. Since the deformation of the partition wall 40 can be controlled by the tension of the wire 50, a mechanism for decompressing the fluid chamber 25 is unnecessary. It is easy to keep an air gap between the elastic body 14 and the rigid member 13 at positive pressure by not decompressing the fluid chamber 25. It is possible to softly bring the elastic body 14 into contact with the target object using the positive pressure as a cushion. Since it is easy to keep the air gap between the elastic body 14 and the rigid member 13 at the positive pressure, it is also possible to omit the partition wall 43 and simplify the configuration.

Manufacturing Method for the Robot Hand 1

A manufacturing method for the robot hand 1 according to this embodiment is explained with reference to the robot hand 1 explained above. FIGS. 17A to 17C, FIG. 18A to 18C, FIG. 19A to 19C, FIGS. 20A to 20C, and FIGS. 21A to 21C are process diagrams showing the manufacturing method for the robot hand 1 (the finger section 2). Note that explanation of processes common to the second embodiment is simplified or omitted.

Figure 17A:
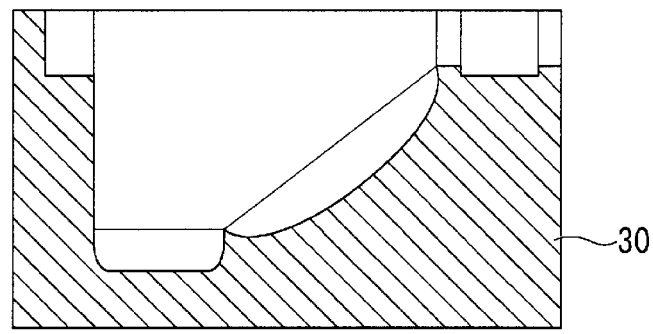
FIGS. 17A to 17C are process diagrams showing a manufacturing method for the robot hand.
Figure 17B:
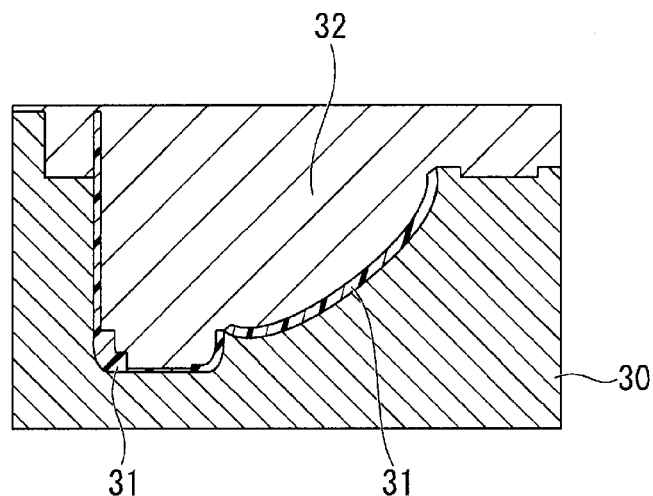
Figure 17C:
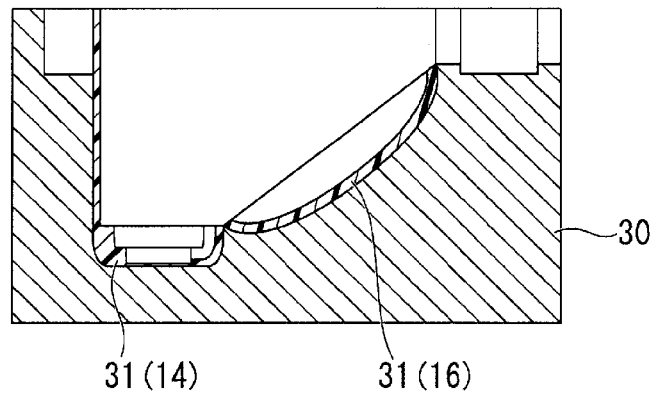

To manufacture the finger section 2 in this embodiment, as shown in FIG. 17A, the die 30 corresponding to the external shapes of the elastic body 14 and the elastic body of the finger section 2 (see FIG. 15) is prepared. Subsequently, as shown in FIG. 17B, the soft resin 31 is deposited on the die 30. The opposite side of the die 30 in the soft resin 31 is molded using the die 32. Consequently, the elastic body 14 and the elastic body 16 are formed. Subsequently, as shown in FIG. 17C, the die 32 is removed from the soft resin 31 while a state in which the soft resin 31 is fit in the die 30 is maintained.

Figure 18A:
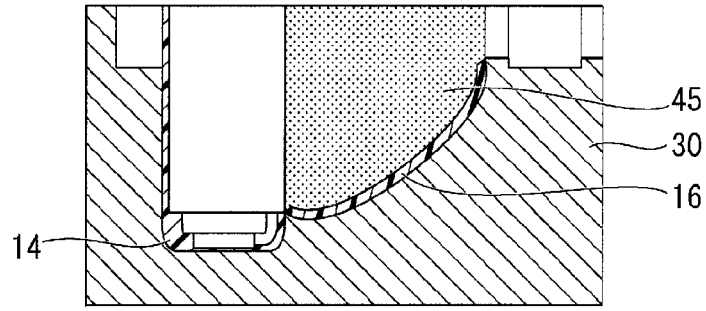
FIGS. 18A to 18C are process diagrams following FIG. 17C.
Figure 18B:
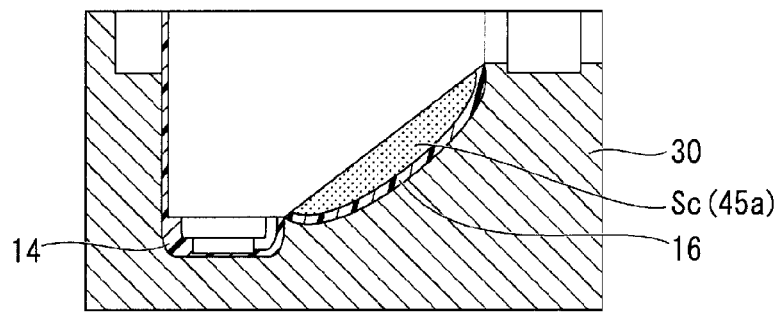
Figure 18C:
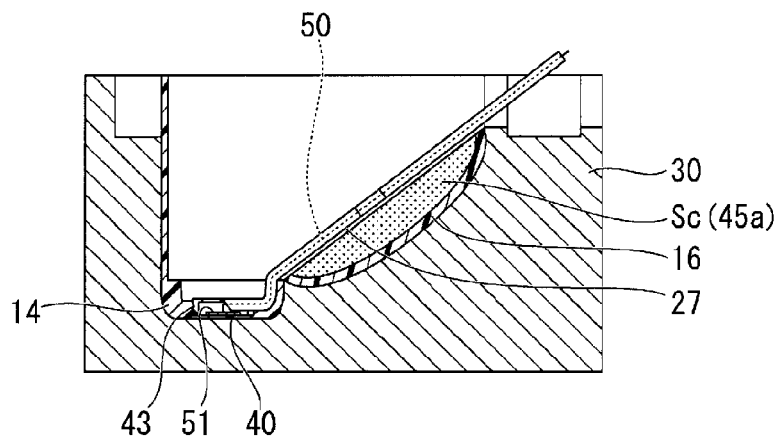

Subsequently, as shown in FIG. 18A, a sacrificial material is deposited on the elastic body 16 to form the sacrificial section 45. Subsequently, the sacrificial section 45 is molded by cutting or die-molding. As shown in FIG. 18B, the sacrificial section 45a is formed in the space Sc, which changes to the fluid chamber 28, between the elastic body 16 and the bottom section 18a of the rigid member 13 shown in FIG. 15. Subsequently, as shown in FIG. 18C, the reinforcing section 51 is formed on the partition wall 40. The partition wall 43 is formed of hard resin or the like in the elastic body 14. The pipe communicating with the fluid chamber 25 on the inner side of the partition wall 43 is attached. The wire 50 is inserted through the inner side of the pipe 27. One end of the wire 50 is connected to the reinforcing section 51.

Figure 19A:
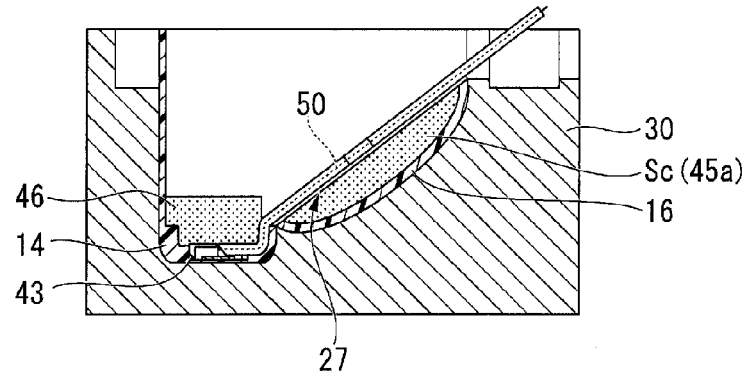
FIGS. 19A to 19C are process diagrams following FIG. 18C.
Figure 19B:
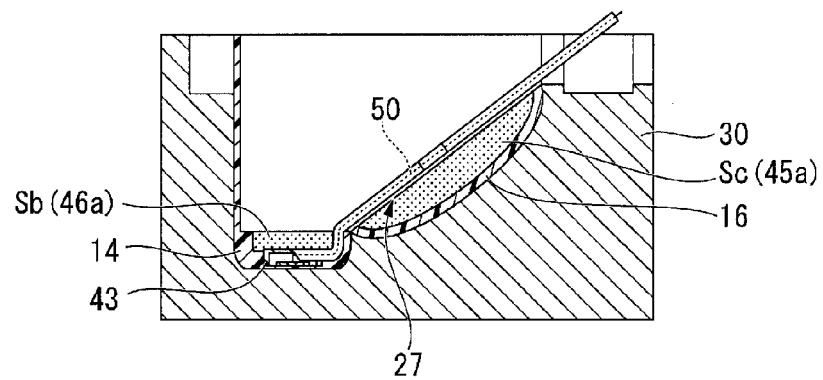
Figure 19C:
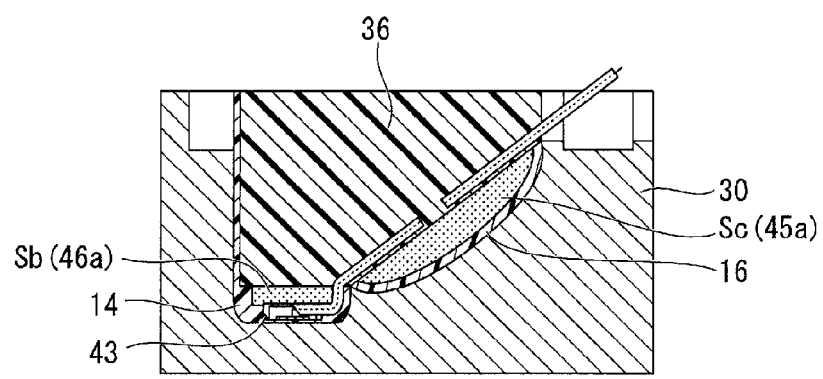

Subsequently, as shown in FIG. 19A, the sacrificial material is deposited on the partition wall 43 and on the pipe 27 to form the sacrificial section 46. Subsequently, the sacrificial section 46 is molded by cutting or die-molding. As shown in FIG. 19B, the sacrificial section 46a is formed in the space Sb, which changes to the fluid chamber 22, between the elastic body 14 and the side section 18b of the rigid member 13 shown in FIG. 15. Subsequently, as shown in FIG. 19C, the hard resin 36 is deposited on the sacrificial section 45a and on the sacrificial section 46a as a material forming the rigid member 13 shown in FIG. 15.

Figure 20A:
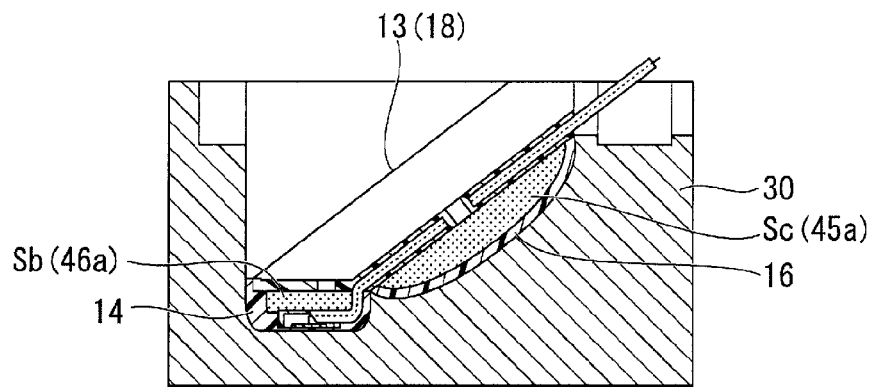
FIGS. 20A to 20C are process diagrams following FIG. 19C.
Figure 20B:
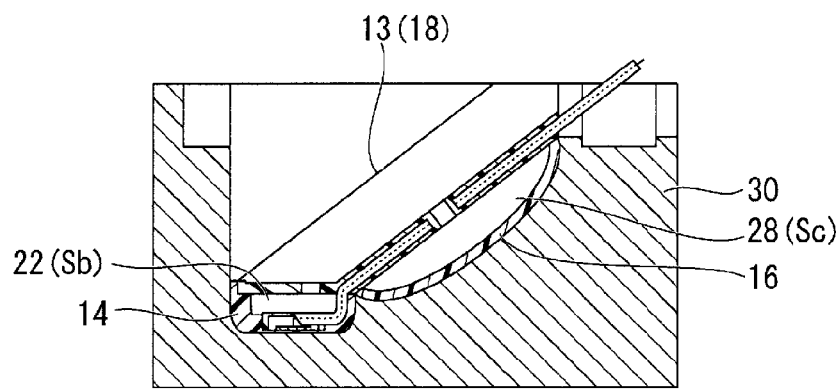
Figure 20C:
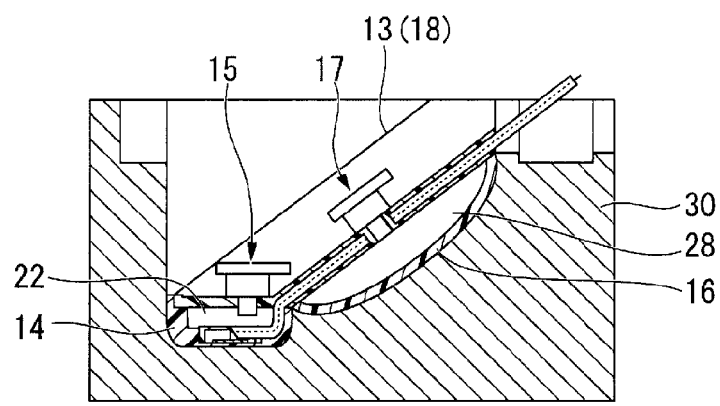

Subsequently, the hard resin 36 is molded by cutting or the like. As shown in FIG. 20A, the box-like section 18 of the rigid member 13 is formed. As shown in FIG. 20B, the sacrificial section 45a is removed to change the space Sc occupied by the sacrificial section 45a to the fluid chamber 28. The sacrificial section 46a is removed to change the space Sb occupied by the sacrificial section 46a to the fluid chamber 22. Subsequently, as shown in FIG. 20C, the pressure sensor 15 is attached to the side section 18b of the rigid member 13. The pressure sensor 17 is attached to the bottom section 18a of the rigid member 13.

Figure 21A:
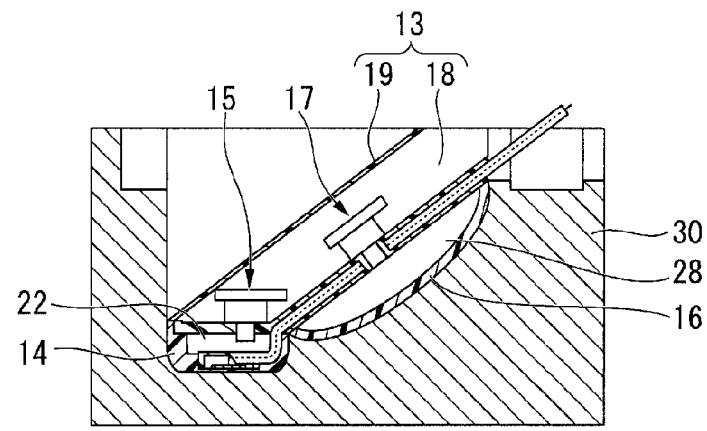
FIGS. 21A to 21C are process diagrams following FIG. 20C.
Figure 21B:
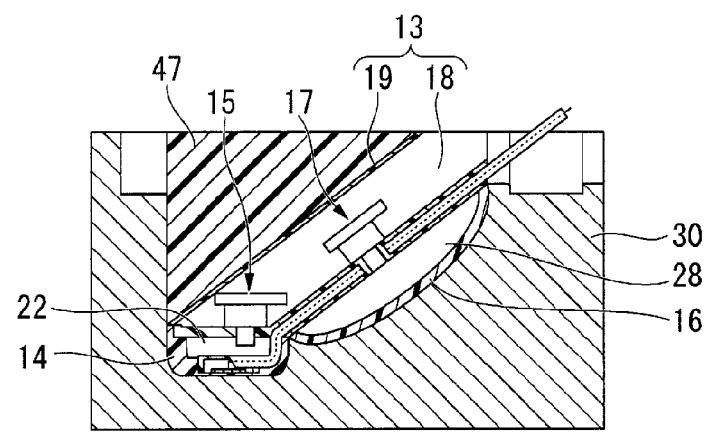
Figure 21C:
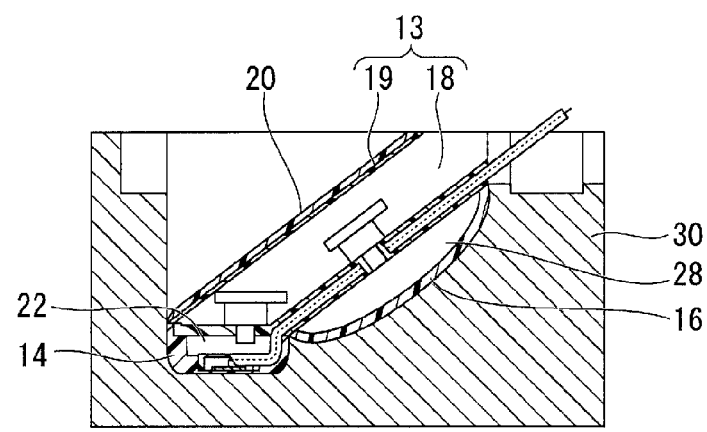

Subsequently, as shown in FIG. 21A, the lid section 19 is bonded to the box-like section 18 of the rigid member to seal the inner side of the box-like section 18. Subsequently, as shown in FIG. 21B, the soft resin 47 is deposited on the lid section 19. Subsequently, the soft resin 47 is molded by cutting or the like. As shown in FIG. 21C, the sealing material 20 is formed. The finger section 2 shown in FIG. 15 is obtained by, for example, removing the die 30.

With the manufacturing method for the robot hand 1 according to this embodiment explained above, since the fluid chamber 28 is formed by removing the sacrificial section 45a shown in FIGS. 20A and 20B, the fluid chamber 28 can be formed integrally with the elastic body 16 and the rigid member 13. Similarly, since the fluid chamber 22 is formed by removing the sacrificial section 46a, the fluid chamber 22 can be formed integrally with the elastic body 14 and the rigid member 13. Since the air gap in which the fluid is stored is formed integrally with the member around the air gap in this way, it is possible to suppress manufacturing costs and realize a high function with a simple configuration.

Note that, in the embodiments explained above, a sensor that detects the deformation of the elastic body 14 is the pressure sensor 15 that detects the pressure of the fluid chamber 22. However, the sensor may be a sensor that detects values other than the pressure. For example, it is also possible that a strain gauge is provided in the elastic body 14 and a change in an electric resistance value of the strain gauge involved in the deformation of the elastic body 14 is detected.

Fourth Embodiment

A fourth embodiment is explained. In this embodiment, components same as the components in the first embodiment are denoted by reference numerals and signs same as the reference numerals and signs in the first embodiment. Explanation of the components is simplified or omitted.

Robot Hand

Figure 22:
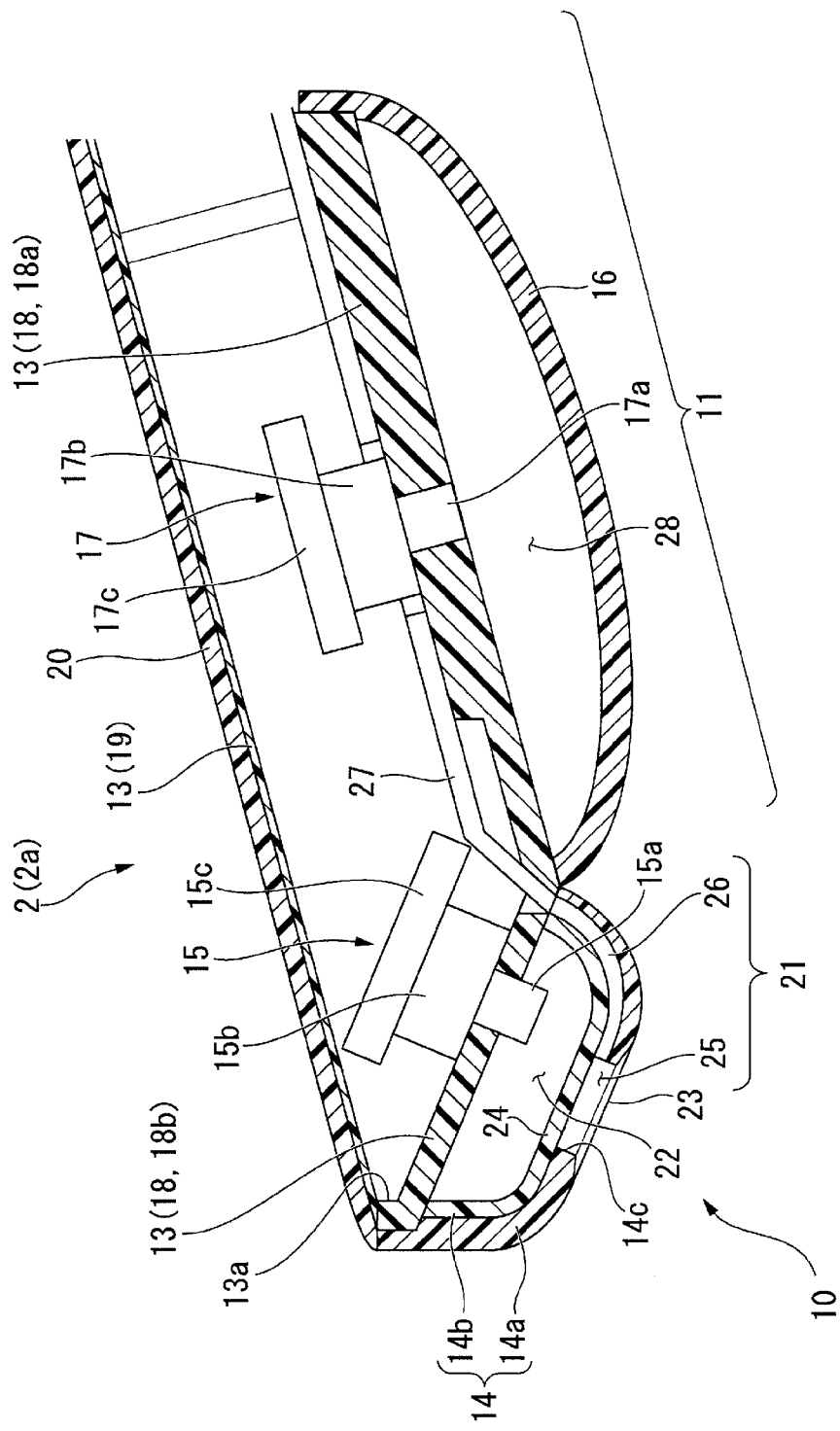
FIG. 22 is a sectional view showing a finger section of a robot hand according to a fourth embodiment.

FIG. 22 is a sectional view showing a finger section of a robot hand according to this embodiment. The finger section 2 in this embodiment is different from the embodiments explained above in the configuration of the attracting section 21. The attracting section 21 includes a suction channel for sucking fluid and the fluid chamber 25 (a first fluid chamber) communicating with the suction channel.

The fluid chamber 25 is connected to a suction device (not shown in the figure) via the channel 26, which is an example of the suction channel, and the pipe 27. When a target object is attracted, the suction device connected to the pipe 27 sucks fluid in the fluid chamber 25 via the pipe 27 and the channel 26. Then, the fluid between the attracting section 21 and the target object is sucked from the suction port 23 of the attracting section 21. The air gap between the attracting section 21 and the target object is decompressed. According to the decompression, the target object is attracted by the attracting section 21 to come into contact with the elastic body 14 and sticks to the attracting section 21.

In the robot hand having such a configuration, as in the embodiments explained above, the sensor 15 that detects deformation of the elastic body 14 is provided in the finger section 2 in which the elastic body 14 including the attracting section 21 is provided. Therefore, it is possible to accurately detect an attraction state of an object with the sensor 15. As a result, it is possible to accurately control the attraction state of the object. For example, since a fall or the like of the object is prevented, it is possible to stably hold the object.

Manufacturing Method for the Robot Hand

A manufacturing method for the robot hand 1 according to this embodiment is the same as the manufacturing method according to the first embodiment. Therefore, explanation of the manufacturing method is omitted.

Robot

A robot is explained. In this embodiment, components same as the components in the embodiments explained above are denoted by reference numerals and signs same as the reference numerals and signs in the embodiments. Explanation of the components is simplified or omitted.

Figure 23:
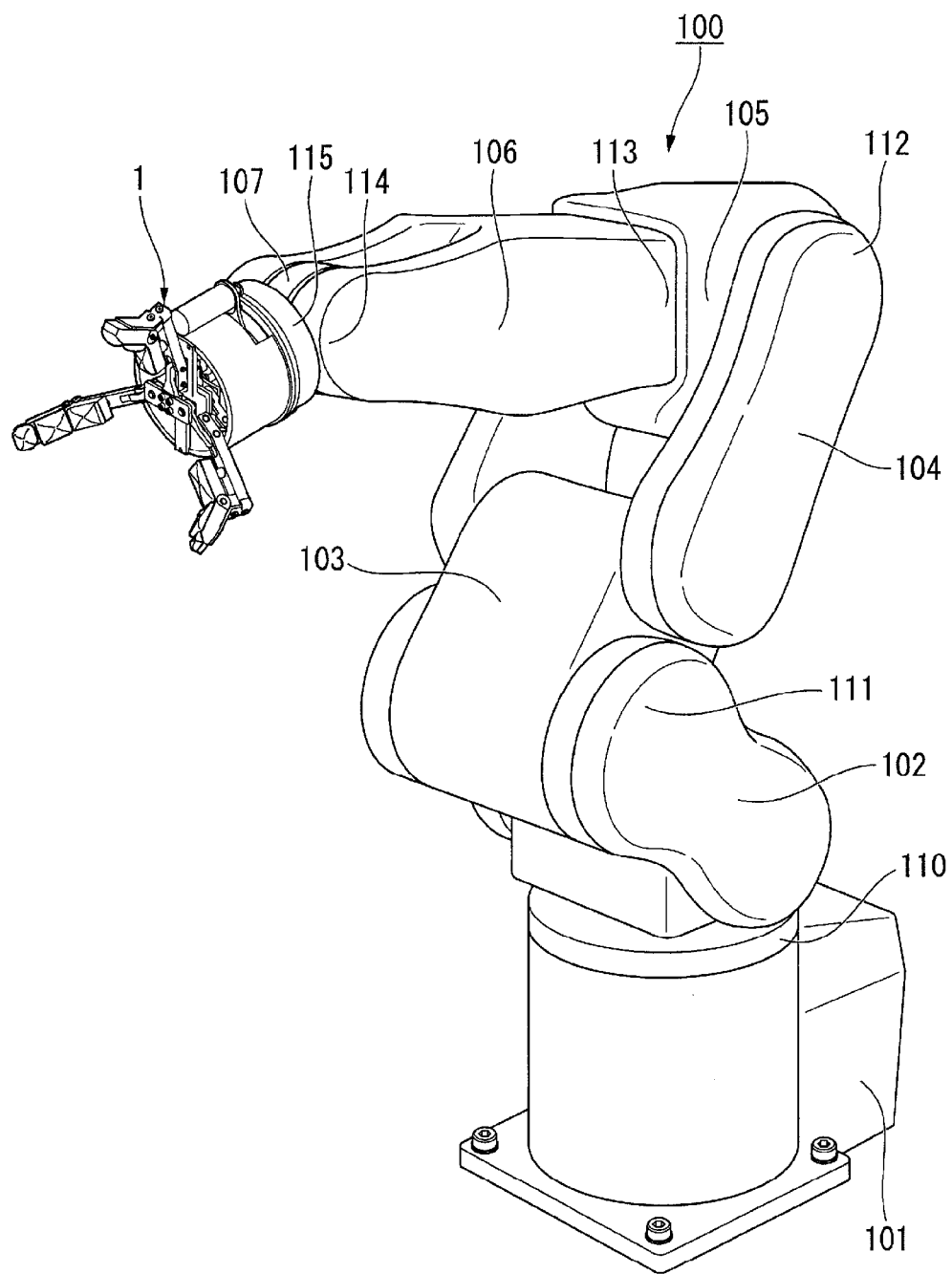
FIG. 23 is a diagram showing a robot according to the embodiment.

FIG. 23 is a diagram showing a robot 100 according to this embodiment. The robot 100 shown in FIG. 23 is used as, for example, an industrial robot arm. The robot 100 includes a multi-axis arm and the robot hand 1 attached to the distal end of the multi-axis arm. The multi-axis arm includes an attaching section 101, a first link 102, a second link 103, a third link 104, a fourth link 105, a fifth link 106, and a sixth link 107.

The attaching section 101 is a portion attached to, for example, a floor, a wall, or a ceiling. The first to sixth links 102 to 107 are connected, for example, in series in order from the attaching section 101. In the robot 100, the attaching section 101 and the first link 102 are rotatably coupled and the links are rotatably coupled by connecting sections (joints 110, 111, 112, 113, 114, and 115). Since each of the first to sixth links 102 to 107 is rotatably provided, by rotating the respective links with the joints 110 to 115 as appropriate, the entire robot arm can perform composite actions.

The sixth link 107 is a distal end portion of the robot arm in the robot 100. The robot hand 1 explained in the embodiments is attached to the distal end section of the sixth link 107.

Since the robot 100 in this embodiment includes the robot hand 1 according to the embodiments, it is possible to realize a high function with a simple configuration. Note that, an example of the robot including the six joints is shown in FIG. 23. However, the number of joints is not limited. As the number of joints increases, it is possible to give more redundancy to the motion of the arm.

Figure 24:
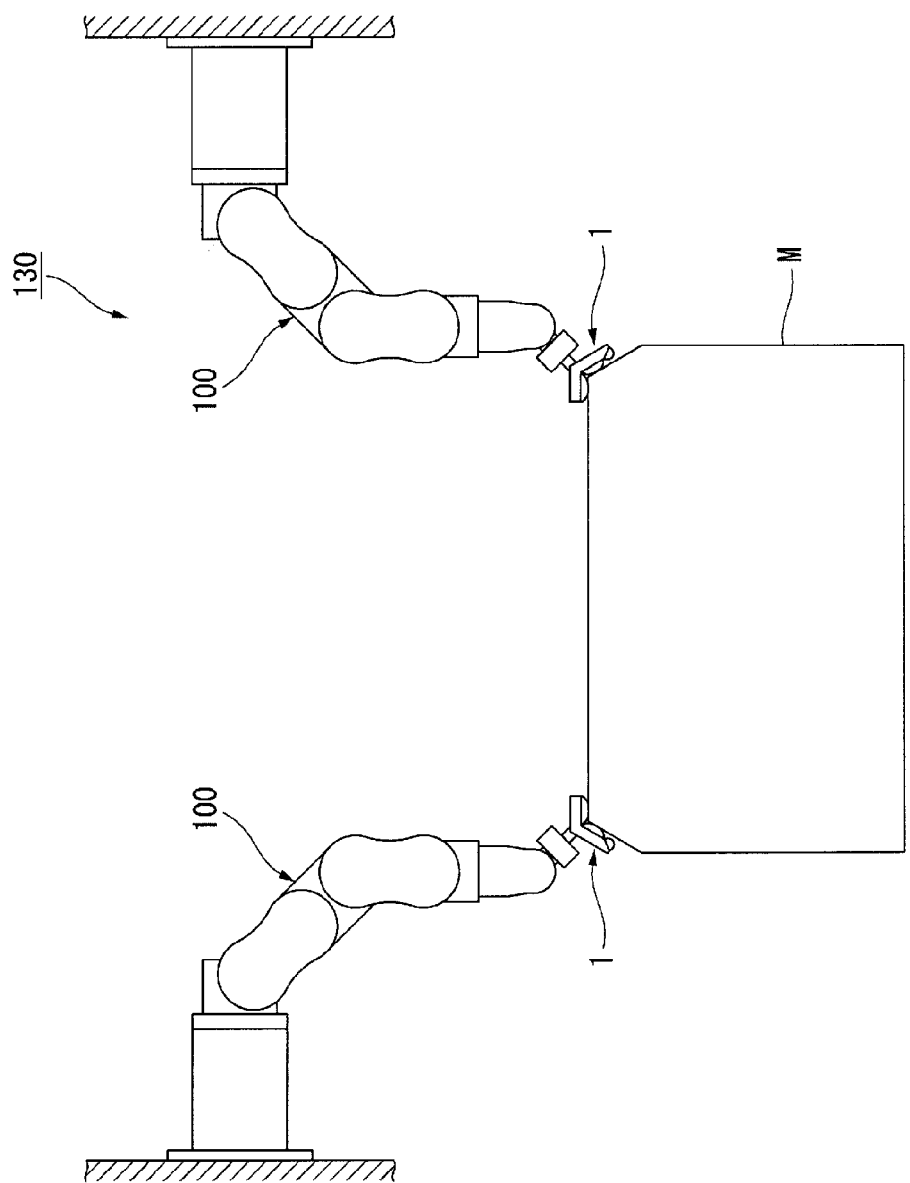
FIG. 24 is a diagram showing a robot in another aspect.

FIG. 24 is a diagram showing a robot 130 in another aspect. The robot 130 is a double arm robot in which a plurality of (a pair of) the multi-axis arms (the robots 100) shown in FIG. 23 are provided. By providing the robot hands in the respective two arms, the robot 130 can cause the robot hands 1 of the two arms to hold a target object M and perform work.

Figure 25:
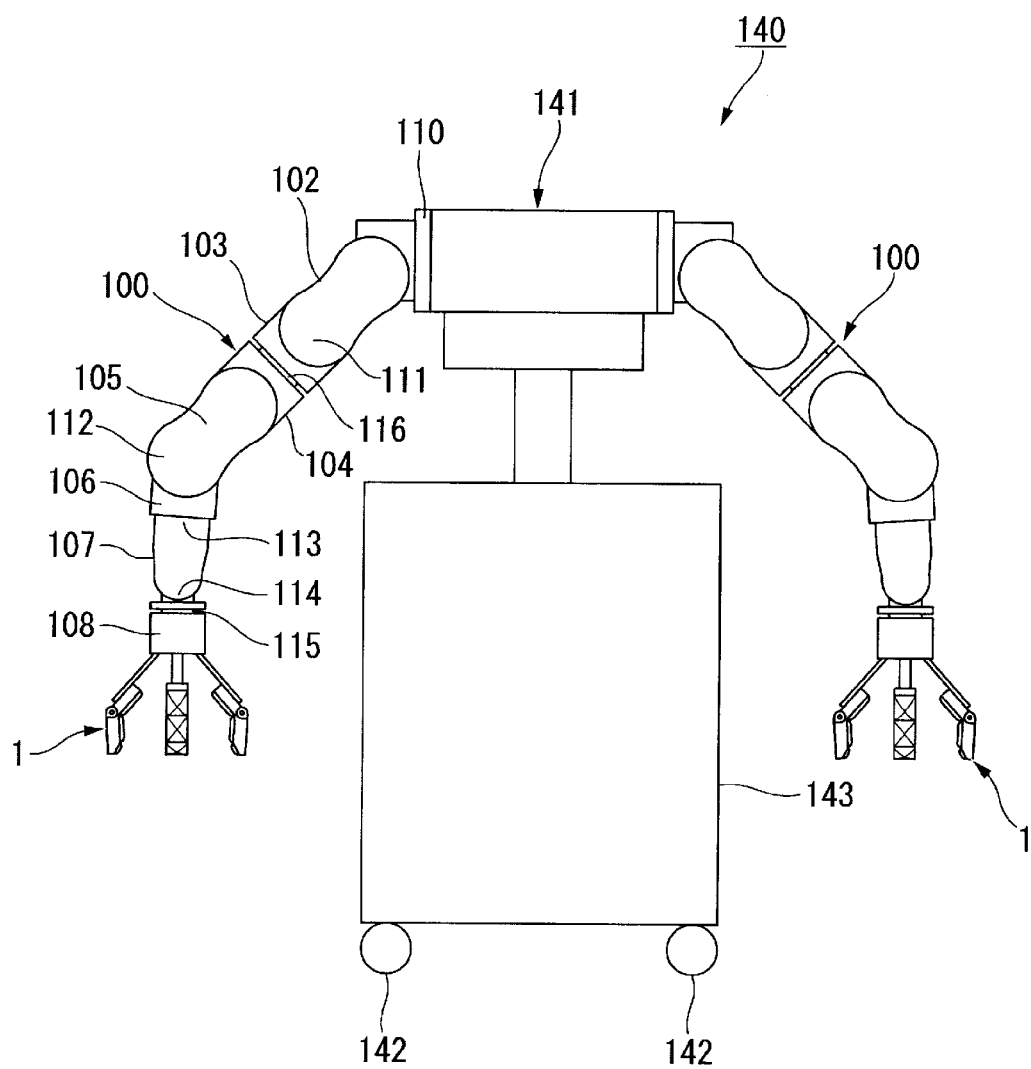
FIG. 25 is a diagram showing a robot in another aspect.

FIG. 25 is a diagram showing a robot 140 in another aspect. The robot 140 includes a body section 141 and two multi-axis arms (robots 100) provided in the body section 141. The robot hands 1 shown in FIG. 23 are respectively provided in the two multi-axis arms. In FIG. 25, the multi-axis arms are seven-axis arms including first to seventh links 102 to 108. In the robot 140, the seven-axis arm is formed by providing a rotating shaft 116 between the joint 111 and the joint 112 among the six connecting sections (the joints 110, 111, 112, 113, 114, and 115).

The robot 140 can realize, for example, a motion and a gripping form of the arms same as a motion and a gripping form of a human for holding one large object using the two arms and the two hands. The robots including the plurality of arms (robot hands 1) shown in FIGS. 24 and 25 can grip a large target object compared with a robot including one robot arm. The robots can grip an object in a box with the two robot arms by inserting finger sections into a gap between the box and the object.

In the robot 140, the body section 141 is supported by a main body section 143 that includes wheels 142 in the bottom and houses a not-shown control device. The robot 140 is movable with the wheels 142. Therefore, it is easy to, for example, expand a work range and change a setting position.

Note that the technical scope of the invention is not limited to the embodiments. The constituent elements explained in the embodiments can be combined as appropriate. At least one of the constituent elements explained in the embodiments is sometimes omitted. A variety of modifications are possible without departing from the spirit of the invention.

The entire disclosure of Japanese Patent Application Nos. 2014-019586, filed Feb. 4, 2014 and 2014-019587, filed Feb. 4, 2014 are expressly incorporated by reference herein.

What is claimed is:

1. A robot hand including a finger section, the robot hand comprising:
   an elastic body provided in the finger section and including an attracting section that attracts an object; and
   a sensor provided in the finger section and configured to detect deformation of the elastic body, wherein the attracting section includes: a partition wall arranged on a surface of the elastic body; a first fluid chamber partitioned by the partition wall, fluid being stored in the first fluid chamber; and a suction port for sucking the fluid from the first fluid chamber.

2. The robot hand according to claim 1, wherein
   the sensor is arranged to be capable of detecting pressure of a pressure changing section that causes a pressure change according to the deformation of the elastic body, and
   the pressure changing section includes a second fluid chamber in which the fluid is stored.

3. A manufacturing method for the robot hand according to claim 2, wherein a process for forming an air gap in which fluid is stored in the robot hand includes:
   forming a first wall section in a part of a periphery of a space that changes to the air gap;
   forming, on the first wall section, a sacrificial section in the space that changes to the air gap;

forming, on the sacrificial section, a second wall section that surrounds, in conjunction with the first wall section, the space that changes to the air gap; and removing the sacrificial section and forming the space surrounded by the first wall section and the second wall section as the air gap.

4. The robot hand according to claim 1, wherein
the fluid includes gas, and
the sensor is arranged to be capable of detecting pressure of the gas.

5. A manufacturing method for the robot hand according to claim 4, wherein a process for forming an air gap in which fluid is stored in the robot hand includes:

forming a first wall section in a part of a periphery of a space that changes to the air gap;

forming, on the first wall section, a sacrificial section in the space that changes to the air gap;

forming, on the sacrificial section, a second wall section that surrounds, in conjunction with the first wall section, the space that changes to the air gap; and removing the sacrificial section and forming the space surrounded by the first wall section and the second wall section as the air gap.

6. The robot hand according to claim 1, wherein a plurality of structures including the elastic bodies and the sensors are provided in the finger section.

7. A manufacturing method for the robot hand according to claim 6, wherein a process for forming an air gap in which fluid is stored in the robot hand includes:

forming a first wall section in a part of a periphery of a space that changes to the air gap;

forming, on the first wall section, a sacrificial section in the space that changes to the air gap;

forming, on the sacrificial section, a second wall section that surrounds, in conjunction with the first wall section, the space that changes to the air gap; and removing the sacrificial section and forming the space surrounded by the first wall section and the second wall section as the air gap.

8. The robot hand according to claim 1, wherein the robot hand includes a plurality of the finger sections.

9. A manufacturing method for the robot hand according to claim 8, wherein a process for forming an air gap in which fluid is stored in the robot hand includes:

forming a first wall section in a part of a periphery of a space that changes to the air gap;

forming, on the first wall section, a sacrificial section in the space that changes to the air gap;

forming, on the sacrificial section, a second wall section that surrounds, in conjunction with the first wall section, the space that changes to the air gap; and removing the sacrificial section and forming the space surrounded by the first wall section and the second wall section as the air gap.

10. A manufacturing method for the robot hand according to claim 1, wherein a process for forming an air gap in which fluid is stored in the robot hand includes:

forming a first wall section in a part of a periphery of a space that changes to the air gap;

forming, on the first wall section, a sacrificial section in the space that changes to the air gap;

forming, on the sacrificial section, a second wall section that surrounds, in conjunction with the first wall section, the space that changes to the air gap; and removing the sacrificial section and forming the space surrounded by the first wall section and the second wall section as the air gap.

11. A robot comprising:

a robot hand including a finger section, an elastic body provided in the finger section and including an attracting section that attracts the object, and a sensor provided in the finger section and configured to detect deformation of the elastic body; and an arm configured to support the robot hand, wherein the attracting section includes: a partition wall arranged on a surface of the elastic body; a first fluid chamber partitioned by the partition wall, fluid being stored in the first fluid chamber; and a suction port for sucking the fluid from the first fluid chamber.

* * * * *